United States Patent
Yamada et al.

(10) Patent No.: US 8,795,870 B2
(45) Date of Patent: Aug. 5, 2014

(54) LITHIUM ION SECONDARY BATTERY, ELECTRONIC DEVICE, ELECTRIC POWER TOOL, ELECTRICAL VEHICLE, AND ELECTRIC POWER STORAGE SYSTEM

(75) Inventors: Ichiro Yamada, Fukushima (JP); Tadahiko Kubota, Kanagawa (JP)

(73) Assignee: Sony Corporation, Tokyo (JP)

(\*) Notice: Subject to any disclaimer, the term of this patent is extended or adjusted under 35 U.S.C. 154(b) by 163 days.

(21) Appl. No.: 13/420,317

(22) Filed: Mar. 14, 2012

(65) Prior Publication Data
US 2012/0263994 A1    Oct. 18, 2012

(30) Foreign Application Priority Data
Apr. 12, 2011 (JP) .................. 2011-088092

(51) Int. Cl.
*H01M 2/16* (2006.01)
*H01M 10/0564* (2010.01)

(52) U.S. Cl.
CPC ........ *H01M 2/1686* (2013.01); *H01M 10/0564* (2013.01)
USPC ............ 429/144; 429/252; 429/213; 429/246

(58) Field of Classification Search
None
See application file for complete search history.

(56) References Cited

FOREIGN PATENT DOCUMENTS

| | | | |
|---|---|---|---|
| DE | 10304734 A1 * | 7/2004 | ............ H01M 2/14 |
| JP | HEI 07-302614 | 11/1995 | |
| JP | 2000-058117 | 2/2000 | |
| JP | 2003-306549 | 10/2003 | |
| JP | 2004-526278 | 8/2004 | |
| JP | 2003-317801 | 1/2005 | |
| JP | 2005-002159 | 1/2005 | |
| JP | 2005-008882 | 1/2005 | |
| JP | 2008-171813 | 7/2008 | |
| JP | 2010015895 A * | 1/2010 | |
| WO | 03/019713 | 3/2003 | |

OTHER PUBLICATIONS

Machine translation of Hennige et al. DE 10304734 A1.*
Machine translation of Sueki et al. JP 2010015895 A.*

\* cited by examiner

*Primary Examiner* — Milton I Cano
*Assistant Examiner* — Wojciech Haske
(74) *Attorney, Agent, or Firm* — K&L Gates LLP

(57) ABSTRACT

A lithium ion secondary battery includes a cathode and an anode being opposed to each other with a separator in between, and an electrolytic solution. One or more of the cathode, the anode, and the separator contain an organic silicon compound including a compound having a polysilsesquioxane skeleton.

9 Claims, 5 Drawing Sheets

LITHIUM ION SECONDARY BATTERY, ELECTRONIC DEVICE, ELECTRIC POWER TOOL, ELECTRICAL VEHICLE, AND ELECTRIC POWER STORAGE SYSTEM

CROSS REFERENCES TO RELATED APPLICATIONS

The present application claims priority to Japanese Priority Patent Application JP 2011-088092 filed in the Japan Patent Office on Apr. 12, 2011, the entire content of which is hereby incorporated by reference.

BACKGROUND

The present application relates to a lithium ion secondary battery including a cathode and an anode opposed to each other with a separator in between, an electronic device using the same, an electric power tool using the same, an electrical vehicle using the same, and an electric power storage system using the same.

In recent years, electronic devices represented by a mobile phone and a personal digital assistant (PDA) have been widely used, and it has been strongly demanded to further reduce their size and weight and to achieve their long life. Accordingly, as a power source for the electronic devices, a battery, in particular, a small and light-weight secondary battery capable of providing a high energy density has been developed. In recent years, it has been considered to apply such a secondary battery not only to the foregoing electronic devices but also to various applications represented by an electric power tool such as an electrical drill, an electrical vehicle such as an electrical automobile, and an electric power storage system such as a home electrical power server.

As the secondary battery, secondary batteries using various charge and discharge principles have been widely proposed. Specially, a lithium ion secondary battery using insertion and extraction of lithium ions is considered promising, since the lithium ion secondary battery provides a higher energy density than lead batteries, nickel cadmium batteries, and the like.

The secondary battery includes a cathode, an anode, and an electrolytic solution. The cathode and the anode respectively contain a cathode active material and an anode active material that insert and extract lithium ions. In the secondary battery, in order to obtain a high battery capacity, a lithium composite oxide such as $LiCoO_2$ is used as the cathode active material, and a carbon material such as graphite is used as the anode active material.

In the secondary battery, in general, its operating voltage is from 2.5 V to 4.2 V both inclusive. One of the reasons the operating voltage is allowed to be increased up to 4.2 V even in a single battery is as follows. That is, since the cathode is separated from the anode by a separator, the secondary battery is electrochemically stable.

In terms of performance of the secondary battery, it is demanded to further increase its battery capacity. Meanwhile, in the existing secondary batteries, only about 60% of the theoretical capacity of the lithium composite oxide as the cathode active material is used. Therefore, what we call a remaining capacity exists. Therefore, to use the remaining capacity, it has been proposed to realize a high energy density by increasing the charge voltage to a value larger than 4.2 V (for example, see WO03/019713).

However, in the case where the charge voltage is increased to a value larger than 4.2 V, a large amount of lithium ions is extracted from the lithium composite oxide, and therefore the cathode becomes unstable thermally and electrically. Thereby, side reactions such as a decomposition reaction of the electrolytic solution easily occur, and gas is easily generated in the battery resulting from the side reactions. Therefore, cycle characteristics are lowered, and safety is lowered resulting from battery swollenness.

Therefore, it has been proposed to suppress side reactions even if a charge voltage is increased by adding an aromatic compound to an electrolytic solution (for example, see Japanese Unexamined Patent Application Publication Nos. 07-302614 and 2000-058117). As the aromatic compound, an anisole derivative having π electron orbit in which the reversible oxidation-reduction electric potential is more noble than the cathode electric potential at full charge, an ether derivative having a specific chemical structure, and the like are used. The aromatic compound is reacted in the oxidant atmosphere in the vicinity of the surface of the cathode at a late stage of charging, and suppresses gas generation.

In addition, to improve ion conductivity of lithium ions, it is proposed to add an organic silicon compound having a polysilsesquioxane skeleton to an electrolytic solution or a cathode (for example, see Japanese Unexamined Patent Application Publication Nos. 2005-002159, 2008-171813, and 2003-306549).

SUMMARY

To address the issues existing in the case of increasing a charge voltage to increase a battery capacity, various discussions have been made. However, sufficient measures have not been taken yet. In particular, in the case where an additive is added to an electrolytic solution or the like to suppress side reactions in consideration of safety, the additive reacts in the battery and a resistor is formed. Therefore, cycle characteristics are eventually lowered easily. Such a tendency is particularly significant in the high temperature environment in which side reactions are promoted. Therefore, it has been strongly desired to take measures to secure high temperature characteristics, that is, to secure cycle characteristics and safety even in the high temperature environment.

It is desirable to provide a lithium ion secondary battery capable of improving high temperature characteristics, an electronic device, an electric power tool, an electrical vehicle, and an electric power storage system.

According to an embodiment of the present application, there is provided a lithium ion secondary battery including a cathode and an anode being opposed to each other with a separator in between, and an electrolytic solution. One or more of the cathode, the anode, and the separator contain an organic silicon compound, the organic silicon compound including a compound having a polysilsesquioxane skeleton represented by Formula 1 or a compound having a polysilsesquioxane skeleton represented by Formula 2 or both described below,

[Formula 1]

$$[R1SiO_{3/2}]_m \qquad (1)$$

where R1 is an alkyl group with carbon number of 1 to 12, an alkenyl group with carbon number of 1 to 12, an alkynyl group with carbon number of 1 to 12, a cycloalkyl group, or an aryl group, and m is one of integer numbers 4 to 12,

[Formula 2]

$$[R2SiO_{3/2}]_n[XSiO_{3/2}]_{n-1} \qquad (2)$$

where R2 is an alkyl group with carbon number of 1 to 12, an alkenyl group with carbon number of 1 to 12, an alkynyl group with carbon number of 1 to 12, a cycloalkyl group, or an aryl group; X is a hydrogen group, a halogen group, an alkyl group containing an unsaturated bond, an ester group, an ester group containing an unsaturated bond, a halogenated silyl group, or an alkyl group containing a halogenated silyl group; and n is one of integer numbers 4 to 12.

According to an embodiment of the present application, there is provided an electronic device using a lithium ion secondary battery, the lithium ion secondary battery including a cathode and an anode being opposed to each other with a separator in between, and an electrolytic solution. One or more of the cathode, the anode, and the separator contain an organic silicon compound, the organic silicon compound including a compound having a polysilsesquioxane skeleton represented by Formula 1 or a compound having a polysilsesquioxane skeleton represented by Formula 2 or both described below,

[Formula 1]

$$[R1SiO_{3/2}]_m \qquad (1)$$

where R1 is an alkyl group with carbon number of 1 to 12, an alkenyl group with carbon number of 1 to 12, an alkynyl group with carbon number of 1 to 12, a cycloalkyl group, or an aryl group, and m is one of integer numbers 4 to 12,

[Formula 2]

$$[R2SiO_{3/2}]_n[XSiO_{3/2}]_{n-1} \qquad (2)$$

where R2 is an alkyl group with carbon number of 1 to 12, an alkenyl group with carbon number of 1 to 12, an alkynyl group with carbon number of 1 to 12, a cycloalkyl group, or an aryl group; X is a hydrogen group, a halogen group, an alkyl group containing an unsaturated bond, an ester group, an ester group containing an unsaturated bond, a halogenated silyl group, or an alkyl group containing a halogenated silyl group; and n is one of integer numbers 4 to 12.

According to an embodiment of the present application, there is provided an electric power tool using a lithium ion secondary battery, the lithium ion secondary battery including a cathode and an anode being opposed to each other with a separator in between, and an electrolytic solution. One or more of the cathode, the anode, and the separator contain an organic silicon compound, the organic silicon compound including a compound having a polysilsesquioxane skeleton represented by Formula 1 or a compound having a polysilsesquioxane skeleton represented by Formula 2 or both described below,

[Formula 1]

$$[R1SiO_{3/2}]_m \qquad (1)$$

where R1 is an alkyl group with carbon number of 1 to 12, an alkenyl group with carbon number of 1 to 12, an alkynyl group with carbon number of 1 to 12, a cycloalkyl group, or an aryl group, and m is one of integer numbers 4 to 12,

[Formula 2]

$$[R2SiO_{3/2}]_n[XSiO_{3/2}]_{n-1} \qquad (2)$$

where R2 is an alkyl group with carbon number of 1 to 12, an alkenyl group with carbon number of 1 to 12, an alkynyl group with carbon number of 1 to 12, a cycloalkyl group, or an aryl group; X is a hydrogen group, a halogen group, an alkyl group containing an unsaturated bond, an ester group, an ester group containing an unsaturated bond, a halogenated silyl group, or an alkyl group containing a halogenated silyl group; and n is one of integer numbers 4 to 12.

According to an embodiment of the present application, there is provided an electrical vehicle using a lithium ion secondary battery, the lithium ion secondary battery including a cathode and an anode being opposed to each other with a separator in between, and an electrolytic solution. One or more of the cathode, the anode, and the separator contain an organic silicon compound, the organic silicon compound including a compound having a polysilsesquioxane skeleton represented by Formula 1 or a compound having a polysilsesquioxane skeleton represented by Formula 2 or both described below,

[Formula 1]

$$[R1SiO_{3/2}]_m \qquad (1)$$

where R1 is an alkyl group with carbon number of 1 to 12, an alkenyl group with carbon number of 1 to 12, an alkynyl group with carbon number of 1 to 12, a cycloalkyl group, or an aryl group, and m is one of integer numbers 4 to 12,

[Formula 2]

$$[R2SiO_{3/2}]_n[XSiO_{3/2}]_{n-1} \qquad (2)$$

where R2 is an alkyl group with carbon number of 1 to 12, an alkenyl group with carbon number of 1 to 12, an alkynyl group with carbon number of 1 to 12, a cycloalkyl group, or an aryl group; X is a hydrogen group, a halogen group, an alkyl group containing an unsaturated bond, an ester group, an ester group containing an unsaturated bond, a halogenated silyl group, or an alkyl group containing a halogenated silyl group; and n is one of integer numbers 4 to 12.

According to an embodiment of the present application, there is provided an electric power storage system using a lithium ion secondary battery, the lithium ion secondary battery including a cathode and an anode being opposed to each other with a separator in between, and an electrolytic solution. One or more of the cathode, the anode, and the separator contain an organic silicon compound, the organic silicon compound including a compound having a polysilsesquioxane skeleton represented by Formula 1 or a compound having a polysilsesquioxane skeleton represented by Formula 2 or both described below,

[Formula 1]

$$[R1SiO_{3/2}]_m \qquad (1)$$

where R1 is an alkyl group with carbon number of 1 to 12, an alkenyl group with carbon number of 1 to 12, an alkynyl group with carbon number of 1 to 12, a cycloalkyl group, or an aryl group, and m is one of integer numbers 4 to 12,

[Formula 2]

$$[R2SiO_{3/2}]_n[XSiO_{3/2}]_{n-1} \qquad (2)$$

where R2 is an alkyl group with carbon number of 1 to 12, an alkenyl group with carbon number of 1 to 12, an alkynyl group with carbon number of 1 to 12, a cycloalkyl group, or an aryl group; X is a hydrogen group, a halogen group, an alkyl group containing an unsaturated bond, an ester group, an ester group containing an unsaturated bond, a halogenated silyl group, or an alkyl group containing a halogenated silyl group; and n is one of integer numbers 4 to 12.

According to the lithium ion secondary battery of the embodiment of the present application, one or more of the cathode, the anode, and the separator contain the organic silicon compound, the organic silicon compound including a compound having a polysilsesquioxane skeleton represented by Formula 1 or a compound having a polysilsesquioxane skeleton represented by Formula 2 or both. Thereby, resistance in the battery is not excessively increased, ion conductivity of lithium ions is secured, while side reactions such as decomposition reaction of the electrolytic solution are suppressed even in the high temperature environment. Therefore, high temperature characteristics are allowed to be improved. Further, similar effects are allowed to be obtained in the electronic device, the electric power tool, the electrical vehicle, and the electric power storage system using the foregoing lithium ion secondary battery according to the embodiments of the present application.

It is to be understood that both the foregoing general description and the following detailed description are exemplary, and are intended to provide further explanation of the application as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the application.

DETAILED DESCRIPTION

An embodiment of the present application will be hereinafter described in detail with reference to the drawings. The description will be given in the following order.
1. Lithium Ion Secondary Battery
1-1. Cylindrical Type
1-2. Laminated Film Type
2. Applications of Lithium Ion Secondary Battery
[1. Lithium Ion Secondary Battery/1-1. Cylindrical Type]

Figure 1:
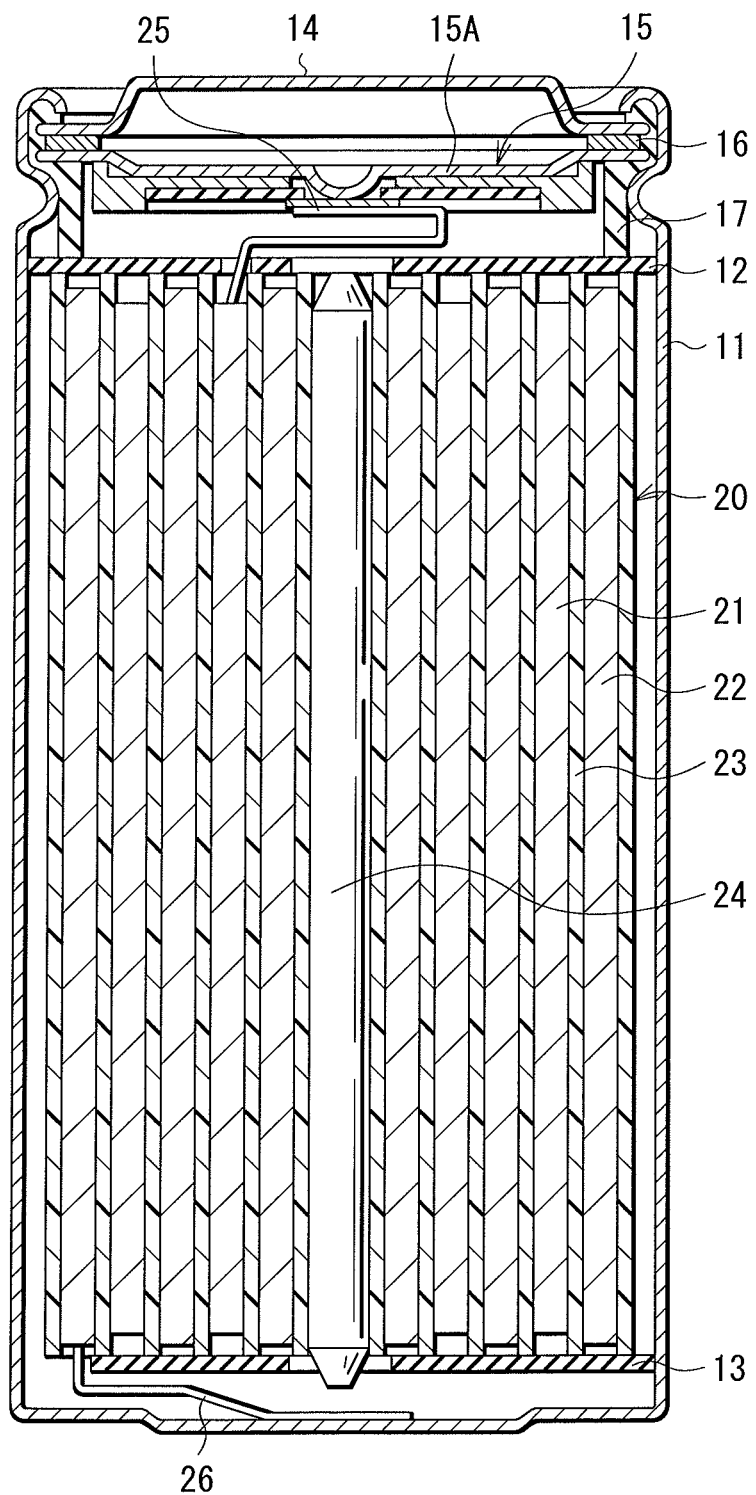
FIG. 1 is a cross-sectional view illustrating a configuration of a lithium ion secondary battery (cylindrical type) according to an embodiment of the present application.
Figure 2:
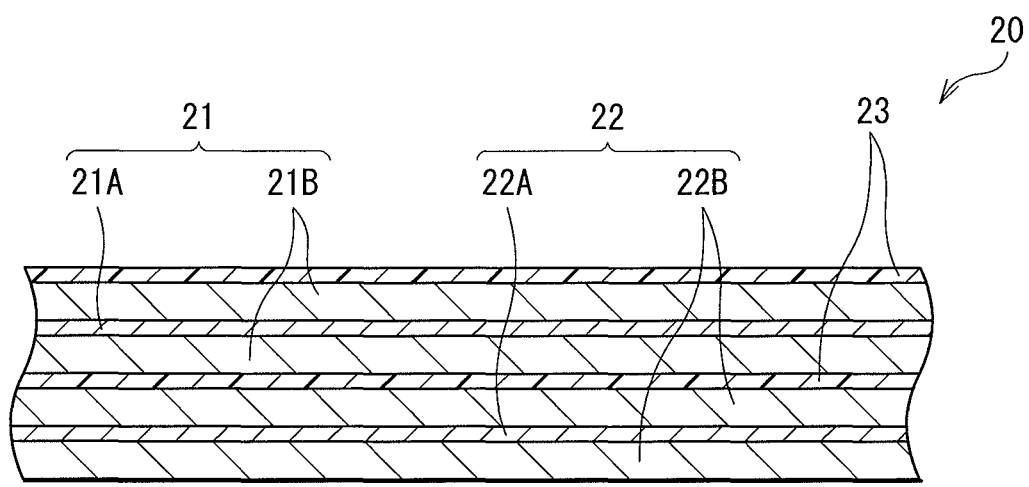
FIG. 2 is a cross-sectional view illustrating an enlarged part of a spirally wound electrode body illustrated in FIG. 1.

FIG. 1 and FIG. 2 illustrate cross-sectional configurations of a lithium ion secondary battery (hereinafter simply referred to as "secondary battery") in an embodiment of this application. FIG. 2 illustrates an enlarged part of a spirally wound electrode body 20 illustrated in FIG. 1.
[Whole Configuration of Secondary Battery]

The secondary battery herein described is, for example, what we call a cylindrical type secondary battery. The secondary battery contains the spirally wound electrode body 20 and a pair of insulating plates 12 and 13 inside a battery can 11 in the shape of an substantially-hollow cylinder. In the spirally wound electrode body 20, for example, a cathode 21 and an anode 22 are layered with a separator 23 in between and are spirally wound.

The battery can 11 has a hollow structure in which one end of the battery can 11 is closed and the other end of the battery can 11 is opened. The battery can 11 is made of, for example, Fe, Al, an alloy thereof, or the like. The surface of the battery can 11 may be plated with Ni or the like. The pair of insulating plates 12 and 13 is arranged to sandwich the spirally wound electrode body 20 in between, and to extend perpendicularly to the spirally wound periphery surface.

At the open end of the battery can 11, a battery cover 14, a safety valve mechanism 15, and a PTC (Positive Temperature Coefficient) device 16 are attached by being swaged with a gasket 17. Thereby, the battery can 11 is hermetically sealed. The battery cover 14 is made of, for example, a material similar to that of the battery can 11. The safety valve mechanism 15 and the PTC device 16 are provided inside the battery cover 14. The safety valve mechanism 15 is electrically connected to the battery cover 14 through the PTC device 16. In the safety valve mechanism 15, in the case where the internal pressure becomes a certain level or more by internal short circuit, external heating, or the like, a disk plate 15A inverts to cut the electric connection between the battery cover 14 and the spirally wound electrode body 20. The PTC device 16 prevents abnormal heat generation resulting from a large current. In the PTC device 16, as temperature rises, the resistance is increased accordingly. The gasket 17 is made of, for example, an insulating material. The surface of the gasket 17 may be coated with asphalt.

In the center of the spirally wound electrode body 20, a center pin 24 may be inserted. For example, a cathode lead 25 made of a conductive material such as Al is connected to the cathode 21, and an anode lead 26 made of a conductive material such as Ni is connected to the anode 22. The cathode lead 25 is, for example, welded to the safety valve mechanism 15, and is electrically connected to the battery cover 14. The anode lead 26 is, for example, welded to the battery can 11, and is electrically connected to the battery can 11.
[Cathode]

In the cathode 21, for example, a cathode active material layer 21B is provided on a single surface or both surfaces of a cathode current collector 21A. The cathode current collector 21A is made of, for example, a conductive material such as Al, Ni, and stainless steel.

The cathode active material layer 21B contains, as a cathode active material, one or more types of cathode materials capable of inserting and extracting lithium ions. As needed, the cathode active material layer 21B may contain other material such as a cathode binder and a cathode electrical conductor.

The cathode material is preferably a lithium-containing compound, since thereby a high energy density is obtained. Examples of the lithium-containing compound include a composite oxide containing Li and a transition metal element as a constituent element and a phosphate compound containing Li and a transition metal element as an element. Specially, it is preferable that the transition metal element be one or more of Co, Ni, Mn, and Fe, since thereby a higher voltage is obtained. The chemical formula thereof is expressed by, for example, $Li_xM1O_2$ or $Li_yM2PO_4$. In the formula, M1 and M2 represent one or more types of transition metal elements. Values of x and y vary according to the charge and discharge state, and are generally in the range of $0.05 \le x \le 1.10$ and $0.05 \le y \le 1.10$.

Examples of the composite oxide containing Li and a transition metal element include $Li_xCoO_2$, $Li_xNiO_2$, and a lithium-nickel composite oxide shown in Formula 3. Examples of the phosphate compound containing Li and a transition metal element include $LiFePO_4$ and $LiFe_{1-u}Mn_uPO_4$ (u<1), since thereby a high battery capacity is obtained and superior cycle characteristics are obtained. As a cathode material, a material other than the foregoing materials may be used.

[Formula 3]

$$LiNi_{1-z}M_zO_2 \qquad (3)$$

In the formula, M is one or more of Co, Mn, Fe, Al, V, Sn, Mg, Ti, Sr, Ca, Zr, Mo, Tc, Ru, Ta, W, Re, Yb, Cu, Zn, Ba, B, Cr, Si, Ga, P, Sb, and Nb. z is in the range of $0.005<z<0.5$.

In addition, the cathode material may be, for example, an oxide, a disulfide, a chalcogenide, a conductive polymer, or the like. Examples of the oxide include titanium oxide, vanadium oxide, and manganese dioxide. Examples of the disulfide include titanium disulfide and molybdenum sulfide. Examples of the chalcogenide include niobium selenide. Examples of the conductive polymer include sulfur, polyaniline, and polythiophene.

The cathode binder is, for example, one or more types of synthetic rubbers, polymer materials, and the like. Examples of the synthetic rubber include styrene butadiene rubber, fluorinated rubber, and ethylene propylene diene. Examples of the polymer material include polyvinylidene fluoride and polyimide.

The cathode electrical conductor is, for example, one or more types of carbon materials and the like. Examples of the carbon materials include graphite, carbon black, acetylene black, and Ketjen black. The cathode electrical conductor may be a metal material, a conductive polymer, or the like as long as the material has the electric conductivity.

[Anode]

In the anode 22, for example, an anode active material layer 22B is provided on a single surface or both surfaces of an anode current collector 22A.

The anode current collector 22A is made of, for example, a conductive material such as Cu, Ni, and stainless steel. The surface of the anode current collector 22A is preferably roughened. Thereby, due to what we call anchor effect, the contact characteristics between the anode current collector 22A and the anode active material layer 22B are improved. In this case, it is enough that the surface of the anode current collector 22A in the region opposed to the anode active material layer 22B is roughened at minimum. Examples of roughening methods include a method of forming fine particles by electrolytic treatment. The electrolytic treatment is a method of providing concavity and convexity by forming fine particles on the surface of the anode current collector 22A by an electrolytic method in an electrolytic bath. A copper foil formed by the electrolytic method is generally called "electrolytic copper foil."

The anode active material layer 22B contains one or more types of anode materials capable of inserting and extracting lithium ions as an anode active material, and may also contain other material such as an anode binder and an anode electrical conductor as needed. Details of the anode binder and the anode electrical conductor are, for example, respectively similar to those of the cathode binder and the cathode electrical conductor. In the anode active material layer 22B, for example, the chargeable capacity of the anode material is preferably larger than the discharge capacity of the cathode 21 in order to prevent unintentional precipitation of Li metal at the time of charge and discharge.

The anode material is, for example, a carbon material. In the carbon material, crystal structure change at the time of insertion and extraction of lithium ions is extremely small. Therefore, the carbon material provides a high energy density and superior cycle characteristics. Further, the carbon material functions as an anode electrical conductor as well. Examples of the carbon material include graphitizable carbon, non-graphitizable carbon in which the spacing of (002) plane is equal to or greater than 0.37 nm, and graphite in which the spacing of (002) plane is equal to or smaller than 0.34 nm. More specifically, examples of the carbon material include pyrolytic carbons, cokes, glassy carbon fiber, an organic polymer compound fired body, activated carbon, and carbon blacks. Of the foregoing, examples of the coke include pitch coke, needle coke, and petroleum coke. The organic polymer compound fired body is obtained by firing (carbonizing) a polymer compound such as a phenol resin and a furan resin at appropriate temperature. In addition, the carbon material may be a low crystalline carbon or amorphous carbon heat-treated at equal to or lower than about 1000 deg C. The shape of the carbon material may be any of a fibrous shape, a spherical shape, a granular shape, and a scale-like shape.

Further, the anode material may be, for example, a material (metal-based material) having one or more types of metal elements and metalloid elements as a constituent element, since a high energy density is thereby obtained. Such a metal-based material may be a simple substance, an alloy, or a compound of a metal element or a metalloid element, may be two or more thereof, or may have one or more phases thereof in part or all thereof "Alloy" includes a material containing one or more metal elements and one or more metalloid elements, in addition to a material formed of two or more metal elements. Further, the alloy may contain a non-metallic element. The structure thereof includes a solid solution, a eutectic crystal (eutectic mixture), an intermetallic compound, and a structure in which two or more thereof coexist.

The foregoing metal element or the foregoing metalloid element is a metal element or a metalloid element capable of forming an alloy with lithium. Specifically, the foregoing metal element or the foregoing metalloid element is one or more of the following elements. That is, the foregoing metal element or the foregoing metalloid element is one or more of Mg, B, Al, Ga, In, Si, Ge, Sn, Pb, Bi, Cd, Ag, Zn, Hf, Zr, Y, Pd, and Pt. Specially, Si or Sn or both are preferably used. Si and Sn have the high ability to insert and extract lithium ions, and therefore, provide a high energy density.

A material containing Si or Sn or both may be, for example, a simple substance, an alloy, or a compound of Si or Sn; two or more thereof; or a material having one or more phases thereof in part or all thereof. The simple substance only means a general simple substance (a small amount of impurity may be therein contained), and does not necessarily mean a purity 100% simple substance.

Examples of the alloys of Si include a material containing one or more of the following elements as a constituent element other than Si. Such an element other than Si is Sn, Ni, Cu, Fe, Co, Mn, Zn, In, Ag, Ti, Ge, Bi, Sb, or Cr. Examples of the compounds of Si include a material containing C or O as a constituent element other than Si. For example, the compounds of Si may contain one or more of the elements described for the alloys of Si as a constituent element other than Si.

Examples of the alloys or the compounds of Si include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq2$), and LiSiO. v in $SiO_v$ may be in the range of $0.2<v<1.4$.

Examples of the alloys of Sn include a material containing one or more of the following elements as an element other than Sn. Such an element is Si, Ni, Cu, Fe, Co, Mn, Zn, In, Ag, Ti, Ge, Bi, Sb or Cr. Examples of the compounds of Sn include a material containing C or O as a constituent element. The compounds of Sn may contain one or more elements described for the alloys of Sn as a constituent element other than Sn. Examples of the alloys or the compounds of Sn include SnO, ($0<w\leq2$), $SnSiO_3$, LiSnO, and $Mg_2Sn$.

Further, as a material containing Sn, for example, a material containing a second constituent element and a third constituent element in addition to Sn as a first constituent element is preferable. The second constituent element may be, for example, one or more of the following elements. That is, the second constituent element may be one or more of Co, Fe, Mg, Ti, V, Cr, Mn, Ni, Cu, Zn, Ga, Zr, Nb, Mo, Ag, In, Ce, Hf, Ta, W, Bi, and Si. The third constituent element may be, for example, one or more of B, C, Al, and P. In the case where the second constituent element and the third constituent element are contained, a high battery capacity, superior cycle characteristics, and the like are obtained.

Specially, a material containing Sn, Co, and C (SnCoC-containing material) is preferable. As the composition of the SnCoC-containing material, for example, the C content is from 9.9 wt % to 29.7 wt % both inclusive, and the ratio of Sn and Co contents (Co/(Sn+Co)) is from 20 wt % to 70 wt % both inclusive, since a high energy density is obtained in such a composition range.

It is preferable that the SnCoC-containing material have a phase containing Sn, Co, and C. Such a phase preferably has a low crystalline structure or an amorphous structure. The phase is a reaction phase capable of reacting with Li. Due to existence of the reaction phase, superior characteristics are obtained. The half bandwidth of the diffraction peak obtained by X-ray diffraction of the phase is preferably equal to or greater than 1.0 deg based on diffraction angle of 2θ in the case where CuKα ray is used as a specific X ray, and the insertion rate is 1 deg/min. Thereby, lithium ions are more smoothly inserted and extracted, and reactivity with the electrolytic solution is decreased. In some cases, the SnCoC-containing material has a phase containing a simple substance or part of the respective constituent elements in addition to the low crystalline or amorphous phase.

Whether or not the diffraction peak obtained by X-ray diffraction corresponds to the reaction phase capable of reacting with Li is allowed to be easily determined by comparison between X-ray diffraction charts before and after electrochemical reaction with Li. For example, if the position of the diffraction peak after electrochemical reaction with Li is changed from the position of the diffraction peak before the electrochemical reaction with Li, the obtained diffraction peak corresponds to the reaction phase capable of reacting with Li. In this case, for example, the diffraction peak of the low crystalline or amorphous reaction phase is seen in the range of 2θ=from 20 to 50 deg both inclusive. Such a reaction phase has, for example, the foregoing respective constituent elements, and the low crystalline or amorphous structure possibly results from existence of C mainly.

In the SnCoC-containing material, part or all of C as an constituent element are preferably bonded with a metal element or a metalloid element as other element, since thereby cohesion or crystallization of Sn or the like is suppressed. The bonding state of elements is allowed to be checked by, for example, X-ray photoelectron spectroscopy (XPS). In a commercially available apparatus, for example, as a soft X-ray, Al—Kα ray, Mg—Kα ray, or the like is used. In the case where part or all of C are bonded with a metal element, a metalloid element, or the like, the peak of a synthetic wave of 1s orbit of C (C1s) is shown in a region lower than 284.5 eV. In the apparatus, energy calibration is made so that the peak of 4f orbit of Au atom (Au4f) is obtained in 84.0 eV. At this time, in general, since surface contamination carbon exists on the material surface, the peak of C1s of the surface contamination carbon is regarded as 284.8 eV, which is used as the energy standard. In XPS measurement, the waveform of the peak of C1s is obtained as a form including the peak of the surface contamination carbon and the peak of C in the SnCoC-containing material. Therefore, for example, analysis is made by using commercially available software to isolate both peaks from each other. In the waveform analysis, the position of a main peak existing on the lowest bound energy side is the energy standard (284.8 eV).

The SnCoC-containing material may further contain other constituent element as needed. Examples of other constituent elements include one or more of Si, Fe, Ni, Cr, In, Nb, Ge, Ti, Mo, Al, P, Ga, and Bi.

In addition to the SnCoC-containing material, a material containing Sn, Co, Fe, and C (SnCoFeC-containing material) is also preferable. The composition of the SnCoFeC-containing material is allowed to be freely set. For example, a composition in which the Fe content is set small is as follows. That is, the C content is from 9.9 wt % to 29.7 wt % both inclusive, the Fe content is from 0.3 wt % to 5.9 wt % both inclusive, and the ratio of contents of Sn and Co (Co/(Sn+Co)) is from 30 wt % to 70 wt % both inclusive. Further, for example, a composition in which the Fe content is set large is as follows. That is, the C content is from 11.9 wt % to 29.7 wt % both inclusive, the ratio of contents of Sn, Co, and Fe ((Co+Fe)/(Sn+Co+Fe)) is from 26.4 wt % to 48.5 wt % both inclusive, and the ratio of contents of Co and Fe (Co/(Co+Fe)) is from 9.9 wt % to 79.5 wt % both inclusive. In such a composition range, a high energy density is obtained. The physical properties (half bandwidth and the like) of the SnCoFeC-containing material are similar to those of the foregoing SnCoC-containing material.

Further, as other anode material, for example, a metal oxide, a polymer compound, or the like may be used. The metal oxide may be, for example, iron oxide, ruthenium oxide, molybdenum oxide, or the like. The polymer compound may be, for example, polyacetylene, polyaniline, polypyrrole, or the like.

The anode active material layer 22B is formed by, for example, a coating method, a vapor-phase deposition method, a liquid-phase deposition method, a spraying method, a firing method (sintering method), or a combination of two or more of these methods. The coating method is a method in which, for example, a particulate anode active material is mixed with a binder or the like, the mixture is dispersed in a solvent such as an organic solvent, and the anode current collector is coated with the resultant. Examples of the vapor-phase deposition method include a physical deposition method and a chemical deposition method. Specifically, examples thereof include a vacuum evaporation method, a sputtering method, an ion plating method, a laser ablation method, a thermal chemical vapor deposition method, a chemical vapor deposition (CVD) method, and a plasma chemical vapor deposition method. Examples of the liquid-phase deposition method include an electrolytic plating method and an electroless plating method. The spraying method is a method in which an anode active material is sprayed in a fused state or a semi-fused state. The firing method is, for example, a method in which after the anode current collector is coated by a procedure similar to that of the coating method, heat treatment is performed at temperature higher than the melting point of the binder or the like. Examples of the firing method include a known technique such as an atmosphere firing method, a reactive firing method, and a hot press firing method.

In the lithium ion secondary battery, as described above, the electrochemical equivalent of the anode material capable of inserting and extracting lithium ions is larger than the electrochemical equivalent of the cathode in order to prevent unintentional precipitation of Li metal on the anode 22 at the time of charge. Further, if an open-circuit voltage at the time of complete charge (that is, a battery voltage) is equal to or greater than 4.25 V, an extraction amount of lithium ions per unit weight is larger than that in the case that the battery voltage is 4.20 V even if the same cathode active material is used. Accordingly, amounts of the cathode active material and the anode active material are adjusted. Thereby, a high energy density is obtained.

[Separator]

The separator 23 separates the cathode 21 from the anode 22, and passes lithium ions while preventing current short circuit resulting from contact of both electrodes. The separator 23 is formed of, for example, a porous film made of a synthetic resin or ceramics. The separator 23 may be a laminated film in which two or more types of porous films are layered. Examples of the synthetic resin include polytetrafluoroethylene, polypropylene, and polyethylene.

[Electrolytic Solution]

The separator 23 is impregnated with an electrolytic solution as a liquid electrolyte. In the electrolytic solution, an electrolyte salt is dissolved in a solvent. The electrolytic solution may contain other material such as various additives as needed.

For example, the solvent contains one or more types of nonaqueous solvents such as an organic solvent. Examples thereof include ethylene carbonate, propylene carbonate, butylene carbonate, dimethyl carbonate, diethyl carbonate, ethyl methyl carbonate, methylpropyl carbonate, $\gamma$-butyrolactone, $\gamma$-valerolactone, 1,2-dimethoxyethane, and tetrahydrofuran. Further examples thereof include 2-methyltetrahydrofuran, tetrahydropyran, 1,3-dioxolane, 4-methyl-1,3-dioxolane, 1,3-dioxane, and 1,4-dioxane. Furthermore, examples thereof include methyl acetate, ethyl acetate, methyl propionate, ethyl propionate, methyl butyrate, methyl isobutyrate, trimethyl methyl acetate, and trimethyl ethyl acetate. Furthermore, examples thereof include acetonitrile, glutaronitrile, adiponitrile, methoxyacetonitrile, 3-methoxypropionitrile, N,N-dimethylformamide, N-methylpyrrolidinone, and N-methyloxazolidinone. Furthermore, examples thereof include N,N'-dimethylimidazolidinone, nitromethane, nitroethane, sulfolane, trimethyl phosphate, and dimethyl sulfoxide. By using such a nonaqueous solvent, superior battery capacity, superior cycle characteristics, superior conservation characteristics, and the like are obtained.

Specially, one or more of ethylene carbonate, propylene carbonate, dimethyl carbonate, diethyl carbonate, and ethyl methyl carbonate are preferable, since thereby superior characteristics are obtained. In this case, a combination of a high viscosity (high dielectric constant) solvent (for example, specific dielectric constant $\in \geq 30$) such as ethylene carbonate and propylene carbonate and a low viscosity solvent (for example, viscosity$\leq 1$ mPa·s) such as dimethyl carbonate, ethyl methyl carbonate, and diethyl carbonate is more preferable. Thereby, dissociation property of the electrolyte salt and ion mobility are improved.

In particular, the solvent preferably contains a cyclic ester carbonate (unsaturated carbon bond cyclic ester carbonate) having one or more unsaturated carbon bonds. Thereby, a stable protective film is formed on the surface of the anode 22 at the time of charge and discharge, and thus decomposition reaction of the electrolytic solution is suppressed. The unsaturated carbon bond cyclic ester carbonate may be, for example, vinylene carbonate, vinylethylene carbonate, or the like. The content of the unsaturated carbon bond cyclic ester carbonate in the nonaqueous solvent is, for example, from 0.01 wt % to 10 wt % both inclusive, since thereby decomposition reaction of the electrolytic solution is suppressed while battery capacity is not excessively lowered.

Further, the solvent preferably contains a chain ester carbonate (halogenated chain ester carbonate) having one or more halogen groups, or a cyclic ester carbonate (halogenated cyclic ester carbonate) having one or more halogen groups, or both. Thereby, a stable protective film is formed on the surface of the anode 22 at the time of charge and discharge, and thus decomposition reaction of the electrolytic solution is suppressed. Though the halogen group type is not particularly limited, specially, a fluorine group, a chlorine group, or a bromine group is preferable, and the fluorine group is more preferable, since thereby high effect is obtained. However, the number of halogen groups is more preferably two than one, and may be three or more. Thereby, a more rigid and more stable protective film is formed, and thus decomposition reaction of the electrolytic solution is more suppressed. The halogenated chain ester carbonate may be, for example, fluoromethyl methyl carbonate, bis(fluoromethyl)carbonate, difluoromethyl methyl carbonate, or the like. The halogenated cyclic ester carbonate can be 4-fluoro-1,3-dioxolane-2-one, 4,5-difluoro-1,3-dioxolane-2-one, or the like. The content of the halogenated chain ester carbonate and the content of the halogenated cyclic ester carbonate in the nonaqueous solvent are, for example, from 0.01 wt % to 50 wt % both inclusive, since thereby decomposition reaction of the electrolytic solution is suppressed while battery capacity is not excessively lowered.

Further, the solvent may contain sultone (cyclic sulfonic ester), since thereby the chemical stability of the electrolytic solution is improved. Examples of the sultone include propane sultone and propene sultone. The sultone content in the nonaqueous solvent is, for example, from 0.5 wt % to 5 wt % both inclusive, since thereby decomposition reaction of the electrolytic solution is suppressed without excessively decreasing the battery capacity.

Further, the solvent may contain an acid anhydride, since the chemical stability of the electrolytic solution is thereby further improved. Examples of the acid anhydride include a dicarboxylic acid anhydride, a disulfonic acid anhydride, and a carboxylic acid sulfonic acid anhydride. Examples of the dicarboxylic acid anhydride include succinic anhydride, glutaric anhydride, and maleic anhydride. Examples of the disulfonic acid anhydride include anhydrous ethanedisulfonate and anhydrous propanedisulfonic acid. Examples of the carboxylic acid sulfonic acid anhydride include anhydrous sulfobenzoic acid, anhydrous sulfopropionic acid, and anhydrous sulfobutyric acid. The content of the acid anhydride in the nonaqueous solvent is, for example, from 0.5 wt % to 5 wt % both inclusive since thereby decomposition reaction of the electrolytic solution is suppressed without excessively decreasing the battery capacity.

[Electrolyte Salt]

The electrolyte salt contains, for example, one or more types of lithium salts described below. However, the electrolyte salt may contain a salt other than the lithium salt (for example, a light metal salt other than the lithium salt).

Examples of the lithium salt include the following compounds. That is, examples thereof include $LiPF_6$, $LiBF_4$, $LiClO_4$, $LiAsF_6$, $LiB(C_6H_5)_4$, $LiCH_3SO_3$, $LiCF_3SO_3$, $LiAlCl_4$, $Li_2SiF_6$, LiCl, and LiBr. Thereby, superior battery capacity, superior cycle characteristics, superior conservation characteristics, and the like are obtained.

Specially, one or more of $LiPF_6$, $LiBF_4$, $LiClO_4$, and $LiAsF_6$ are preferable, and $LiPF_6$ is more preferable, since thereby internal resistance is lowered, and higher effect is obtained.

The content of the electrolyte salt is preferably from 0.3 mol/kg to 3.0 mol/kg both inclusive with respect to the solvent, since thereby high ion conductivity is obtained.

[Organic Silicon Compound Having Polysilsesquioxane Skeleton]

One or more of the cathode 21, the anode 22, and the separator 23 contain one or both of an organic silicon compound having a polysilsesquioxane skeleton (hereinafter referred to as "PSQ skeleton") shown in Formula 1 and an organic silicon compound having a PSQ skeleton shown in Formula 2 described below (hereinafter simply referred to as "organic silicon compound" as well). With the use of the organic silicon compound, a rigid coat is formed on the surface of the cathode 21, the anode 22, or the like. Thereby, resistance in the battery is not excessively increased, and ion conductivity of lithium ions are secured, while side reactions such as a decomposition reaction of the electrolytic solution are suppressed. Therefore, in particular, side reactions in the high temperature environment are significantly suppressed. One of the organic silicon compounds or two or more thereof may be used.

[Formula 1]

$$[R1SiO_{3/2}]_m \quad (1)$$

In the formula, R1 is an alkyl group with carbon number of 1 to 12, an alkenyl group with carbon number of 1 to 12, an alkynyl group with carbon number of 1 to 12, a cycloalkyl group, or an aryl group. m is one of integer numbers 4 to 12.

[Formula 2]

$$[R2SiO_{3/2}]_n[XSiO_{3/2}]_{n-1} \quad (2)$$

In the formula, R2 is an alkyl group with carbon number of 1 to 12, an alkenyl group with carbon number of 1 to 12, an alkynyl group with carbon number of 1 to 12, a cycloalkyl group, or an aryl group. X is a hydrogen group, a halogen group, an alkyl group containing an unsaturated bond, an ester group, an ester group containing an unsaturated bond, a halogenated silyl group, or an alkyl group containing a halogenated silyl group. n is one of integer numbers 4 to 12.

The organic silicon compound having the PSQ skeleton shown in Formula 1 is a polymer compound having $[R1SiO_{3/2}]$ as a skeleton (repeat unit). Types of groups bonded with both ends thereof (monovalent group) are not particularly limited. A group at the end may be, for example, a hydrogen group (—H), a hydroxyl group (—OH), or the like. Groups on both ends may be identical or different from each other.

Type of R1 is not particularly limited as long as R1 is the alkyl group with carbon number of 1 to 12, the alkenyl group with carbon number of 1 to 12, the alkynyl group with carbon number of 1 to 12, the cycloalkyl group, or the aryl group, and may be a derivative of the foregoing alkyl group or the like. "Derivative" means, for example, a group (halide) obtained by substituting part or all of the alkyl group or the like by a halogen group. The halogen group may be, for example, a fluorine group (—F), a chlorine group (—Cl), a bromine group (—Br), an iodine group (—I), or the like.

Specific examples of R1 include the following. Examples of the alkyl group include a methyl group, an ethyl group, an n-propyl group, an isopropyl group, an n-butyl group, an isobutyl group, a tert-butyl group, a pentyl group, a hexyl group, an octyl group, an isooctyl group, a nonyl group, a decyl group, an adamantyl group, and a dodecyl group. Examples of the alkenyl group include a vinyl group and an allyl group. Examples of the alkynyl group include an ethynyl group. Examples of the cycloalkyl group include a cyclopentyl group and a cyclohexyl group. The derivative of the foregoing alkyl group or the like can be a halide thereof or the like. Examples of the aryl group and derivatives thereof include a phenyl group, a chlorophenyl group, a benzil group, a phenylethyl group, and a vinylphenyl group. Specially, in terms of solubility to various solvents and the like, R1 is preferably an alkyl group with carbon number of 2 to 6 or the aryl group.

The organic silicon compound having the PSQ skeleton shown in Formula 1 is obtained by, for example, a hydrolysis reaction of a trifunctional organic silicon compound such as trichlorosilane ($HSiCl_3$) and trichloromethylsilane ($CH_3SiCl_3$). A value of m as the repeat unit number is not particularly limited as long as m is one of integer numbers 4 to 12. As the organic silicon compound, for example, compounds called a random compound, a cage compound, a ladder compound, and the like are known. The value of m may be determined, for example, according to the compound type. Specially, in terms of solubility to various solvents, synthesis easiness, and the like, the value of m is preferably 8, 10, or 12 corresponding to the cage compound. More specifically, the corresponding compound is a compound shown in one of the following Formulas 4(1) to 4(3). m is 8 in Formula 4(1), m is 10 in Formula 4(2), and m is 12 in Formula 4(3). For the cage organic silicon compounds with different values of m, isolation is allowed by extract operation with the use of a solvent such as hexane. However, a mixture of two or more types of organic silicon compounds with different values of m may be used.

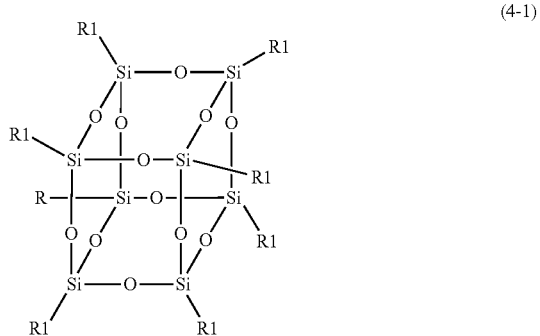

(4-1)

-continued

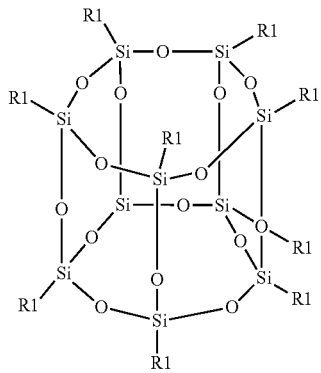

(4-2)

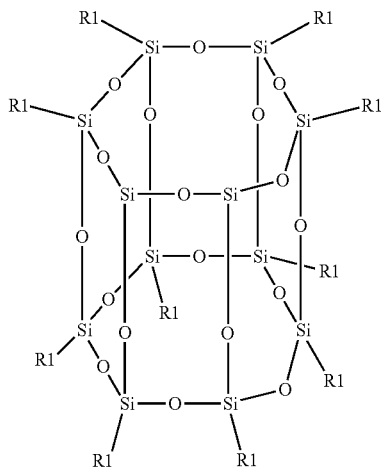

(4-3)

The organic silicon compound having the PSQ skeleton shown in Formula 2 is a polymer compound obtained by substituting part of the skeleton (repeat unit) shown in Formula 1 by $[XSiO_{3/2}]$. Types of groups bonded with both ends thereof (monovalent group) are similar to, for example, those of the organic silicon compound having the PSQ skeleton shown in Formula 1. Type of R2 is similar to the type of R1, for example. The organic silicon compound having the PSQ skeleton shown in Formula 2 has a hydrogen group, a halogen group, or a group containing an unsaturated bond as X. Therefore, a more rigid coat is formed than in a case of not containing the foregoing groups.

Type of X is not particularly limited as long as X is a hydrogen group, a halogen group, an alkyl group containing an unsaturated bond, an ester group, an ester group containing an unsaturated bond, a halogenated silyl group, or an alkyl group containing a halogenated silyl group.

Specific examples of X include the following. Examples of the halogen group include a fluorine group, a chlorine group, a bromine group, and an iodine group. Examples of the alkyl group containing an unsaturated bond include a vinyl group, an allyl group, a norbornenylethyl group, a cyclohexyl group, an epoxypropyl group, an isocyanatoethyl group, and a cyanopropyl group. Examples of the ester group include methyl acetate, ethyl acetate, and methyl propionate. Examples of the ester group containing an unsaturated bond include acrylmethyl and methacrylmethyl. Examples of the halogenated silyl group include a trichlorosilyl group and a chlorodimethylsiloxy group. Examples of the alkyl group containing a halogenated silyl group include a chlorodimethylsilylethyl group and a trichlorosilylethyl group.

The organic silicon compound having the PSQ skeleton shown in Formula 2 is obtained in a procedure similar to that of the organic silicon compound having the PSQ skeleton shown in Formula 1, except that, for example, part of $[R2SiO_{3/2}]_n$ as a repeat unit is substituted by $[XSiO_{3/2}]$.

As described above, the organic silicon compound is contained in one or more of the cathode 21, the anode 22, and the separator 23. Therefore, the organic silicon compound may be contained in one of the cathode 21, the anode 22, and the separator 23, may be contained in given two thereof, or may contained in all of them for the following reason. That is, in the case where the organic silicon compound is contained in one or more of the cathode 21, the anode 22, and the separator 23, the foregoing advantages are obtained by the organic silicon compound.

Aspects in which the cathode 21, the anode 22, and the separator 23 contain the organic silicon compound are not particularly limited, and for example, the following aspects are achievable. However, the aspects hereinafter-described may be combined freely.

Figure 3:
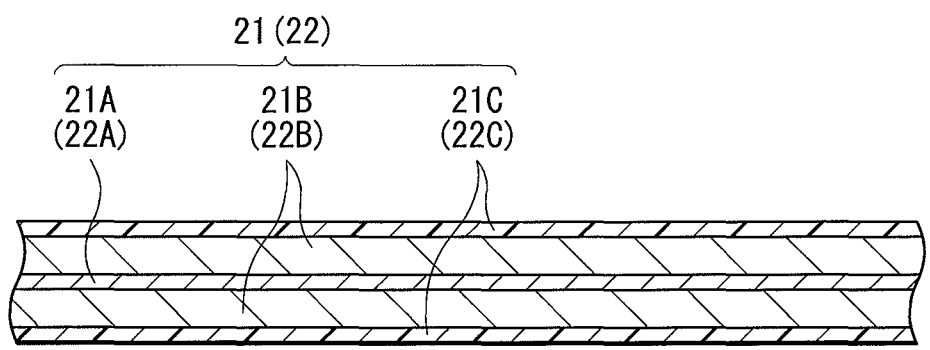
FIG. 3 is a cross-sectional view illustrating a configuration of a cathode and an anode.
Figure 4:
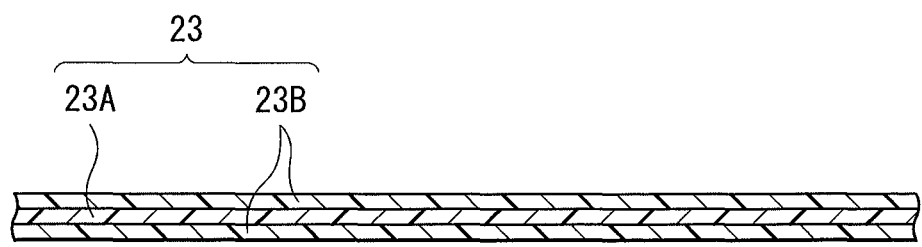
FIG. 4 is a cross-sectional view illustrating a configuration of a separator.

FIG. 3 and FIG. 4 illustrate the aspects that the cathode 21, the anode 22, and the separator 23 contain the organic silicon compound. FIG. 3 and FIG. 4 illustrate cross-sectional configurations of the cathode 21, the anode 22, and the separator 23 corresponding to FIG. 2.

In the case where the cathode 21 contains the organic silicon compound, for example, the organic silicon compound may be contained in the cathode active material layer 21B together with a cathode active material and the like. In this case, in preparing a cathode mixture slurry in a step of forming the cathode active material layer 21B, the organic silicon compound is dispersed in a dispersion solvent together with the cathode active material and the like. Similarly, in the case where the anode 22 contains the organic silicon compound, for example, in preparing an anode mixture slurry in a step of forming the anode active material layer 22B, the organic silicon compound may be dispersed in a dispersion solvent together with the anode active material and the like. Thereby, the organic silicon compound is contained in the anode active material layer 22B.

Further, in the case where the cathode 21 contains the organic silicon compound, for example, as illustrated in FIG. 3, a coating layer 21C may be provided on the surface of the cathode active material layer 21B, and the coating layer 21C may contain the organic silicon compound. In forming the coating layer 21C, in a step of forming the cathode 21, after a solution obtained by dispersing the organic silicon compound in the dispersion solvent is prepared, the surface of the cathode active material layer 21B is coated with the solution, and the resultant is subsequently dried. Otherwise, after the cathode active material layer 21B is soaked in the solution, the cathode active material layer 21B is dried. It is enough that formation range of the coating layer 21C is part or all of the surface of the cathode active material layer 21B.

Similarly, in the case where the anode 22 contains the organic silicon compound, for example, as illustrated in FIG. 3, after a dispersion solution of the organic silicon compound is prepared in a step of forming the anode 22, the surface of the anode active material layer 22B is coated with the solution, or the anode active material layer 22B is soaked in the solution. Thereby, a coating layer 22C may be formed on the surface of the anode active material layer 22B, and the coating layer 22C may contain the organic silicon compound. Formation range of the coating layer 22C is similar to that of coating layer 21C.

In the case where the separator 23 contains the organic silicon compound, for example, as illustrated in FIG. 4, a coating layer 23B may be provided on a surface of a base material layer 23A as a base material, and the coating layer 23B may contain the organic silicon compound. The base material layer 23A is a porous film made of the foregoing synthetic resin or ceramics. In forming the coating layer 23B, after a dispersion solution of the organic silicon compound is prepared, the surface of the base material layer 23A is coated with the solution, and the resultant is subsequently dried. Otherwise, after the base material layer 23A is soaked in the solution, the base material layer 23A is taken out and is dried. It is enough that formation range of the coating layer 23B is part or all of the surface of the base material layer 23A.

[Operation of Secondary Battery]

In the secondary battery, at the time of charge, for example, lithium ions extracted from the cathode 21 are inserted in the anode 22 through the electrolytic solution. In this case, to obtain a high battery capacity, a charge voltage (an open-circuit voltage in a state of complete charge) is preferably equal to or greater than 4.25 V. Meanwhile, at the time of discharge, for example, lithium ions extracted from the anode 22 are inserted in the cathode 21 through the electrolytic solution.

[Method of Manufacturing Secondary Battery]

The secondary battery is manufactured, for example, by the following procedure.

First, the cathode 21 is formed. A cathode active material is mixed with a cathode binder, a cathode electrical conductor, or the like as needed to prepare a cathode mixture, which is subsequently dispersed in a cathode mixture such as an organic solvent to obtain a paste cathode mixture slurry. Subsequently, both surfaces of the cathode current collector 21A are coated with the cathode mixture slurry, which is dried to form the cathode active material layer 21B. Subsequently, the cathode active material layer 21B is compression-molded by a rolling press machine or the like while being heated as needed. In this case, compression-molding may be repeated several times. In forming the cathode 21, the organic silicon compound is contained in the cathode mixture, or the coating layer 21C containing the organic silicon compound is formed on the surface of the cathode active material layer 21B as needed.

Further, the anode 22 is formed by a procedure similar to that of the foregoing cathode 21. An anode active material is mixed with an anode binder, an anode electrical conductor, or the like as needed to prepare an anode mixture, which is subsequently dispersed in an organic solvent or the like to form a paste anode mixture slurry. Subsequently, both surfaces of the anode current collector 22A are coated with the anode mixture slurry, which is dried to form the anode active material layer 22B. After that, the anode active material layer 22B is compression-molded as needed. In forming the anode 22, the organic silicon compound is contained in the anode mixture, or the coating layer 21C containing the organic silicon compound is formed on the surface of the anode active material layer 22B as needed.

Finally, the secondary battery is assembled by using the cathode 21 and the anode 22. First, the cathode lead 25 is attached to the cathode current collector 21A by a welding method or the like, and the anode lead 26 is attached to the anode current collector 22A by the welding method or the like. Subsequently, the cathode 21 and the anode 22 are layered with the separator 23 in between and are spirally wound, and thereby the spirally wound electrode body 20 is formed. After that, the center pin 24 is inserted in the center of the spirally wound electrode body 20. In preparing the separator 23, the coating layer 23B containing the organic silicon compound is formed on the surface of the base material layer 23A as needed. Subsequently, the spirally wound electrode body 20 is sandwiched between the pair of insulating plates 12 and 13, and is contained in the battery can 11. In this case, the tip end of the cathode lead 25 is attached to the safety valve mechanism 15 by using a welding method or the like, and the tip end of the anode lead 26 is attached to the battery can 11 by a welding method or the like. Subsequently, the electrolytic solution is injected into the battery can 11, and the separator 23 is impregnated with the electrolytic solution. Subsequently, at the open end of the battery can 11, the battery cover 14, the safety valve mechanism 15, and the PTC device 16 are swaged with the gasket 17.

[Function and Effect of Secondary Battery]

According to the cylindrical type secondary battery, one or more of the cathode 21, the anode 22, and the separator 23 contain the organic silicon compound having the PSQ skeleton shown in Formula 1 or the organic silicon compound having the PSQ skeleton shown in Formula 2 or both. Thereby, as described above, resistance in the battery is not excessively increased and ion conductivity of lithium ions is secured, while side reactions such as a decomposition reaction of the electrolytic solution are suppressed even in the high temperature environment. Accordingly, high temperature characteristics are allowed to be improved, and thereby cycle characteristics and safety are allowed to be secured even in the high temperature environment. In particular, even if a charge voltage is increased up to a value equal to or larger than 4.25 V, similar effects are allowed to be obtained.

Further, decomposition reactions of the electrolytic solution tend to occur on the surfaces of the cathode 21 and the anode 22. Therefore, in the case where the cathode 21 or the anode 22 or both contain the organic silicon compound, higher effects are allowed to be obtained.

Further, in the case where the organic silicon compound having the PSQ skeleton shown in Formula 1 is used, cycle characteristics are allowed to be improved more in the high temperature environment. Meanwhile, in the case where the organic silicon compound having the PSQ skeleton shown in Formula 2 is used, safety is allowed to be improved more without degrading the cycle characteristics in the high temperature environment.

Further, in the case where a high reactive metal-based material is used as an anode active material, decomposition reactions of the electrolytic solution tend to occur more easily than in the case of using a low reactive carbon material. Therefore, in the case of using the metal-based material, higher effects are allowed to be obtained.

[1-2. Laminated Film Type]

Figure 5:
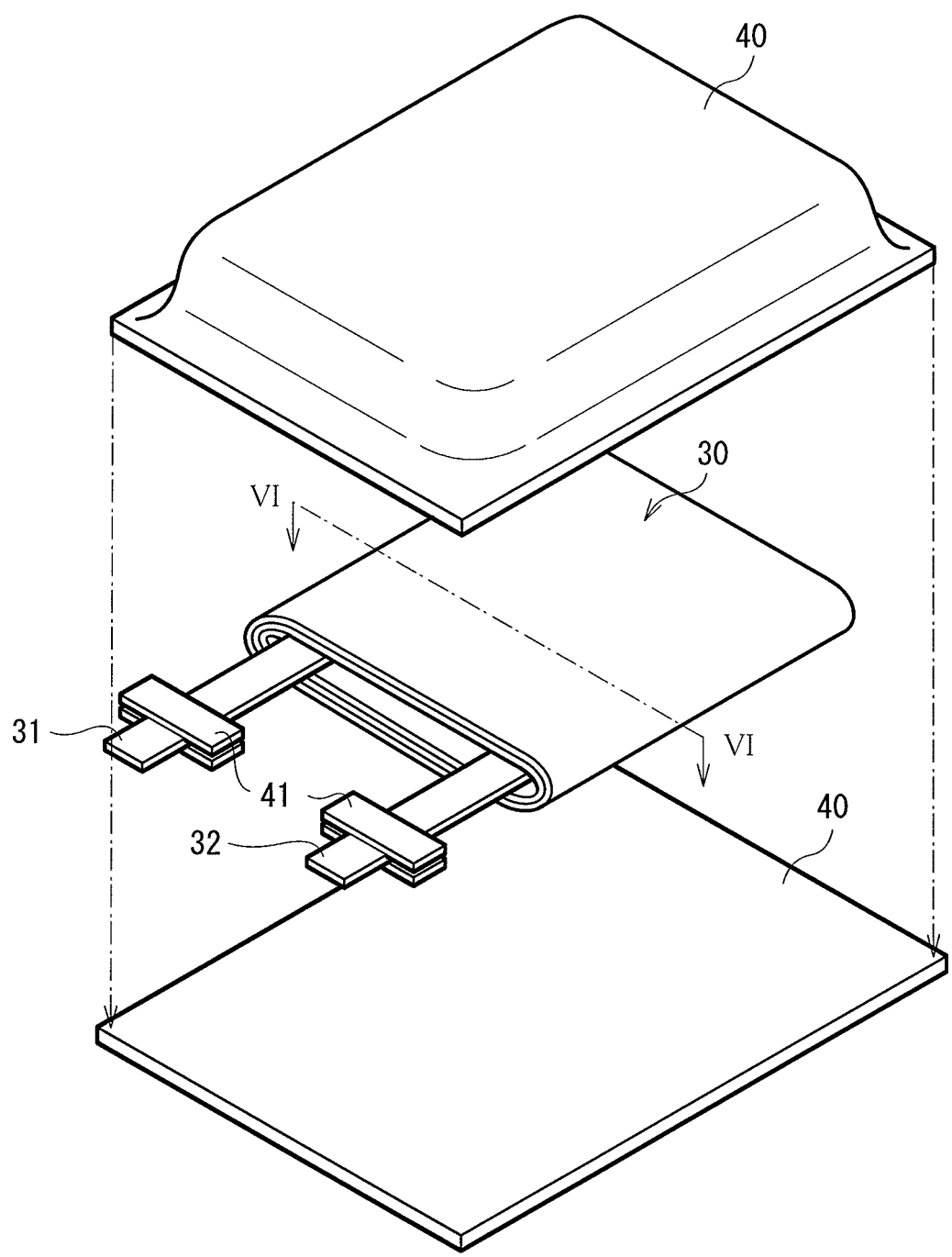
FIG. 5 is a perspective view illustrating a configuration of another lithium ion secondary battery (laminated film type) according to an embodiment of the present application.
Figure 6:
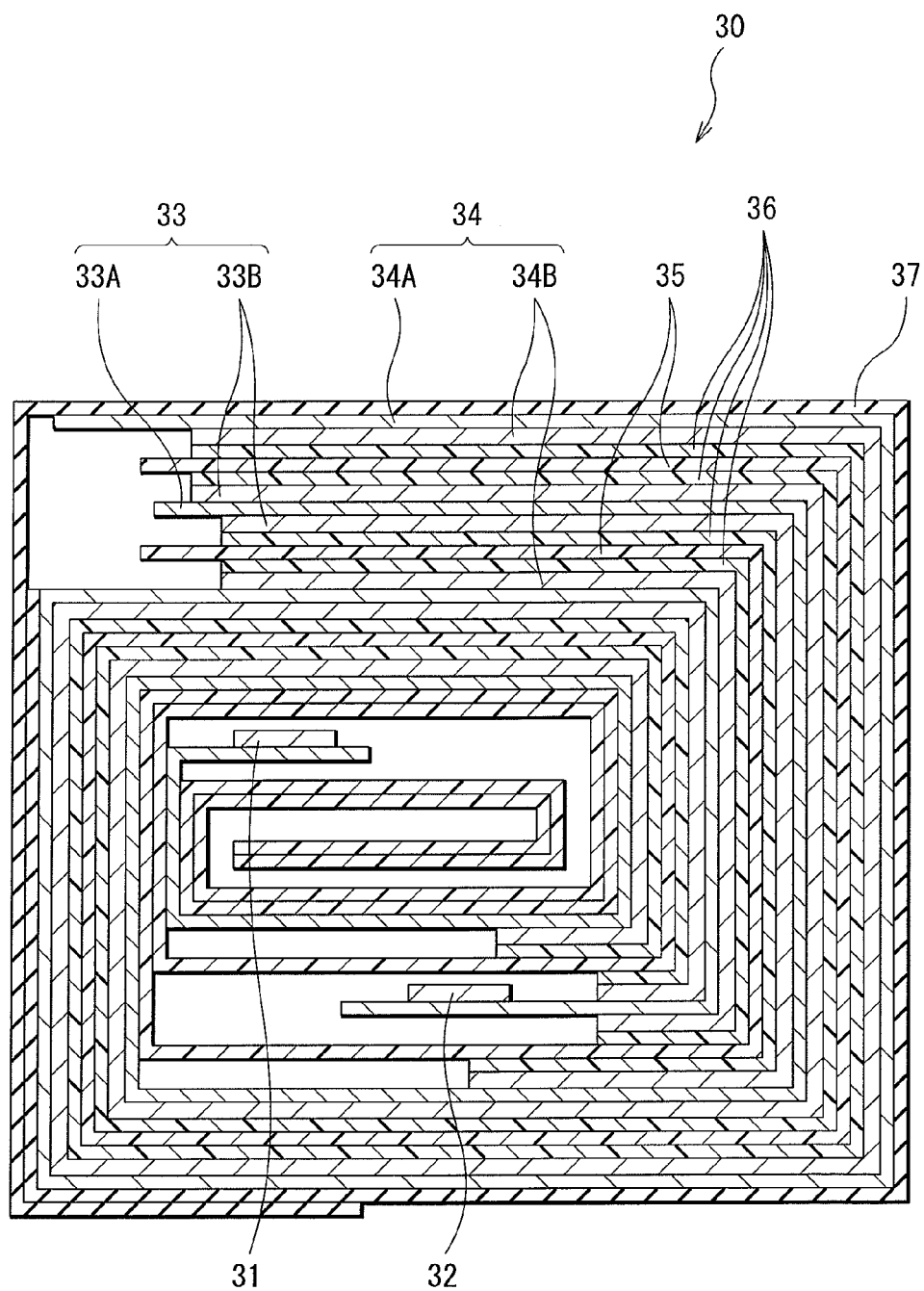
FIG. 6 is a cross-sectional view taken along a line VI-VI of the spirally wound electrode body illustrated in FIG. 5.

FIG. 5 illustrates an exploded perspective configuration of another lithium ion secondary battery according to an embodiment of this application. FIG. 6 illustrates an enlarged cross-section taken along a line VI-VI of a spirally wound electrode body 30 illustrated in FIG. 5. In the following description, the elements of the cylindrical type lithium ion secondary battery described above will be used as needed.

[Whole Structure of Secondary Battery]

The secondary battery herein described is what we call a laminated film type secondary battery. In the secondary battery, the spirally wound electrode body 30 is contained in a film outer package member 40. In the spirally wound electrode body 30, a cathode 33 and an anode 34 are layered with a separator 35 and an electrolyte layer 36 in between and are spirally wound. A cathode lead 31 is attached to the cathode 33, and an anode lead 32 is attached to the anode 34. The outermost periphery of the spirally wound electrode body 30 is protected by a protective tape 37.

The cathode lead 31 and the anode lead 32 are, for example, led out from inside to outside of the outer package member 40 in the same direction. The cathode lead 31 is made of, for example, a conductive material such as Al, and the anode lead 32 is made of, for example, a conducive material such as Cu, Ni, and stainless steel. These materials are in the shape of, for example, a thin plate or mesh.

The outer package member 40 is a laminated film in which, for example, a fusion bonding layer, a metal layer, and a surface protective layer are layered in this order. In the laminated film, for example, the respective outer edges of the fusion bonding layer of two films are bonded with each other by fusion bonding, an adhesive, or the like so that the fusion bonding layer and the spirally wound electrode body 30 are opposed to each other. Examples of the fusion bonding layer include a film made of polyethylene, polypropylene, or the like. Examples of the metal layer include an aluminum foil. Examples of the surface protective layer include a film made of nylon, and polyethylene terephthalate.

Specially, as the outer package member 40, an aluminum laminated film in which a polyethylene film, an aluminum foil, and a nylon film are layered in this order is preferable. However, the outer package member 40 may be made of a laminated film having other laminated structure, a polymer film such as polypropylene, or a metal film.

An adhesive film 41 to protect from outside air intrusion is inserted between the outer package member 40, and the cathode lead 31 and the anode lead 32. The adhesive film 41 is made of a material having adhesion characteristics with respect to the cathode lead 31 and the anode lead 32. Examples of such a material include, for example, a polyolefin resin such as polyethylene, polypropylene, modified polyethylene, and modified polypropylene.

In the cathode 33, for example, a cathode active material layer 33B is provided on both surfaces of a cathode current collector 33A. In the anode 34, for example, an anode active material layer 34B is provided on both surfaces of an anode current collector 34A. The configurations of the cathode current collector 33A, the cathode active material layer 33B, the anode current collector 34A, and the anode active material layer 34B are respectively similar to the configurations of the cathode current collector 21A, the cathode active material layer 21B, the anode current collector 22A, and the anode active material layer 22B. Further, the configuration of the separator 35 is similar to the configuration of the separator 23.

As in the cylindrical type lithium ion secondary battery, one or more of the cathode 33, the anode 34, and the separator 35 contain one or both of the organic silicon compounds having the PSQ skeletons shown in Formula 1 and Formula 2. The organic silicon compound may be contained in the cathode active material layer 33B and the anode active material layer 34B, or may be contained in a coating layer (not herein illustrated) provided to the cathode 33, the anode 34, and the separator 35.

In the electrolyte layer 36, an electrolytic solution is held by a polymer compound. The electrolyte layer 36 may contain other material such as an additive as needed. The electrolyte layer 36 is what we call a gel electrolyte, since thereby high ion conductivity (for example, 1 mS/cm or more at room temperature) is obtained and liquid leakage of the electrolytic solution is prevented.

Examples of the polymer compound include one or more types of the following polymer materials. That is, examples thereof include polyacrylonitrile, polyvinylidene fluoride, polytetrafluoroethylene, polyhexafluoropropylene, polyethylene oxide, polypropylene oxide, polyphosphazene, polysiloxane, and polyvinyl fluoride. Further, examples thereof include polyvinyl acetate, polyvinyl alcohol, polymethacrylic acid methyl, polyacrylic acid, polymethacrylic acid, styrene-butadiene rubber, nitrile-butadiene rubber, polystyrene, and polycarbonate. Further examples thereof include a copolymer of vinylidene fluoride and hexafluoropylene. Specially, polyvinylidene fluoride or the copolymer of vinylidene fluoride and hexafluoropropylene is preferable, and polyvinylidene fluoride is more preferable, since such a polymer compound is electrochemically stable.

The composition of the electrolytic solution is similar to the composition of the cylindrical type secondary battery. However, in the electrolyte layer 36 as the gel electrolyte, a solvent of the electrolytic solution represents a wide concept including not only a liquid solvent but also a material having ion conductivity capable of dissociating the electrolyte salt. Therefore, in the case where the polymer compound having ion conductivity is used, the polymer compound is also included in the solvent.

Instead of the gel electrolyte layer 36, the electrolytic solution may be used as it is. In this case, the separator 35 is impregnated with the electrolytic solution.

[Operation of Secondary Battery]

In the secondary battery, for example, at the time of charge, lithium ions extracted from the cathode 33 are inserted in the anode 34 through the electrolyte layer 36. In this case, as in the cylindrical type secondary battery, to obtain a high battery capacity, a voltage at the time of charge is preferably equal to or greater than 4.25 V. Meanwhile, at the time of discharge, for example, lithium ions extracted from the anode 34 are inserted in the cathode 33 through the electrolyte layer 36.

[Method of Manufacturing Secondary Battery]

The secondary battery including the gel electrolyte layer 36 is manufactured, for example, by the following three types of procedures.

In the first procedure, the cathode 33 and the anode 34 are formed by a formation procedure similar to that of the cathode 21 and the anode 22. In this case, the cathode 33 is formed by forming the cathode active material layer 33B on both surfaces of the cathode current collector 33A, and the anode 34 is formed by forming the anode active material layer 34B on both surfaces of the anode current collector 34A. In this case, the organic silicon compound is contained in the cathode mixture and the anode mixture, or the coating layer containing the organic silicon compound is formed on the surface of the cathode active material layer 33B and the anode active material layer 34B as needed. Subsequently, a precursor solution containing an electrolytic solution, a polymer compound, and a solvent such as an organic solvent is prepared. After that, the cathode 33 and the anode 34 are coated with the precursor solution to form the gel electrolyte layer 36. Subsequently, the cathode lead 31 is attached to the cathode current collector 33A by a welding method or the like and the anode lead 32 is attached to the anode current collector 34A by a welding method or the like. Subsequently, the cathode 33 and the anode 34 provided with the electrolyte layer 36 are layered with the separator 35 in between and are spirally wound to form the spirally wound electrode body 30. After that, the protective tape 37 is adhered to the outermost periphery thereof. In preparing the separator 35, a coating layer containing the organic silicon compound is formed on the surface of the base material layer as needed. Subsequently, after the spirally wound electrode body 30 is sandwiched between two pieces of film-like outer package members 40, outer edges of the outer package members 40 are bonded by a thermal fusion bonding method or the like to enclose the spirally wound electrode body 30 into the outer package members 40. In this case, the adhesive films 41 are inserted between the cathode lead 31 and the anode lead 32, and the outer package member 40.

In the second procedure, the cathode lead 31 is attached to the cathode 33, and the anode lead 32 is attached to the anode 34. Subsequently, the cathode 33 and the anode 34 are layered with the separator 35 in between and are spirally wound to form a spirally wound body as a precursor of the spirally wound electrode body 30. After that, the protective tape 37 is adhered to the outermost periphery thereof. Subsequently, after the spirally wound body is sandwiched between two pieces of the film-like outer package members 40, the outermost peripheries except for one side thereof are bonded by a thermal fusion bonding method or the like to obtain a pouched state, and the spirally wound body is contained in the pouch-like outer package member 40. Subsequently, a composition for electrolyte containing an electrolytic solution, a monomer as a raw material for the polymer compound, a polymerization initiator, and other material such as a polymerization inhibitor as needed is prepared, which is injected into the pouch-like outer package member 40. After that, the outer package member 40 is hermetically sealed by the thermal fusion bonding method or the like. Subsequently, the monomer is thermally polymerized. Thereby, a polymer compound is formed, and therefore the gel electrolyte layer 36 is formed.

In the third procedure, the spirally wound body is formed and contained in the pouch-like outer package member 40 in a manner similar to that of the foregoing second procedure, except that the separator 35 with both surfaces coated with a polymer compound is used. Examples of the polymer compound with which the separator 35 is coated include a polymer containing vinylidene fluoride as a component (a homopolymer, a copolymer, a multicomponent copolymer, or the like). Specific examples thereof include polyvinylidene fluoride, a binary copolymer containing vinylidene fluoride and hexafluoro propylene as components, and a ternary copolymer containing vinylidene fluoride, hexafluoro propylene, and chlorotrifluoroethylene as components. In addition to the polymer containing vinylidene fluoride as a component, other one or more types of polymer compounds may be used. Subsequently, an electrolytic solution is prepared and injected into the outer package member 40. After that, the opening of the outer package member 40 is sealed by a thermal fusion bonding method or the like. Subsequently, the resultant is heated while a weight is applied to the outer package member 40, and the separator 35 is adhered to the cathode 33 and the anode 34 with the polymer compound in between. Thereby, the polymer compound is impregnated with the electrolytic solution, and accordingly the polymer compound is gelated to form the electrolyte layer 36.

In the third procedure, the swollenness of the secondary battery is suppressed compared to the first procedure. Further, in the third procedure, the monomer as a raw material of the polymer compound, the solvent, and the like are less likely to be left in the electrolyte layer 36 compared to in the second procedure. Thus, the formation step of the polymer compound is favorably controlled. Therefore, sufficient adhesion characteristics are obtained between the cathode 33, the anode 34, and the separator 35, and the electrolyte layer 36.

[Function and Effect of Secondary Battery]

According to the laminated film type secondary battery, one or more of the cathode 33, the anode 34, and the separator 35 contain the organic silicon compound having the PSQ skeleton shown in Formula 1 or the organic silicon compound having the PSQ skeleton shown in Formula 2 or both. Therefore, high temperature characteristics are allowed to be improved for a reason similar to that of the foregoing cylindrical type secondary battery. In particular, in the laminated film type secondary battery, battery swollenness easily occurs by being influenced by gas generated resulting from side reactions such as a decomposition reaction of the electrolytic solution, and therefore higher effects are allowed to be obtained. Other functions and effects are similar to those of the cylindrical type secondary battery.

[2. Applications of Lithium Ion Secondary Battery]

Next, a description will be given of application examples of the foregoing lithium ion secondary battery.

Applications of the secondary battery are not particularly limited as long as the secondary battery is used for a machine, a device, an instrument, an apparatus, a system (collective entity of a plurality of devices and the like), or the like that is allowed to use the secondary battery as a drive power source, an electric power storage source for electric power storage, or the like. In the case where the secondary battery is used as a power source, the secondary battery may be used as a main power source (power source used preferentially), or an auxiliary power source (power source used instead of a main power source or used being switched from the main power source). In the latter case, the main power source type is not limited to the secondary battery.

Examples of applications of the secondary battery include electronic devices such as a video camcoder, a digital still camera, a mobile phone, a notebook personal computer, a cordless phone, a headphone stereo, a portable radio, a portable television, and a personal digital assistant (PDA). Examples of the electronic devices include a lifestyle electric appliance such as an electric shaver, a memory device such as a backup power source and a memory card, and a medical electronic device such as a pacemaker and a hearing aid. Examples of applications of the secondary battery further include an electric power tool such as an electric drill and an electric saw, an electrical vehicle such as an electric automobile (including a hybrid car); and an electric power storage system such as a home battery system for storing electric power for emergency or the like.

Specially, the secondary battery is effectively applicable to the electronic device, the electric power tool, the electrical vehicle, the electric power storage system, or the like. In these applications, since superior characteristics of the secondary battery are demanded, the characteristics are allowed to be effectively improved by using the secondary battery according to the embodiment of the present application. The electronic device executes various functions (music replay or the like) by using a secondary battery as a working electric power source. The electric power tool is a tool in which a moving part (for example, a drill or the like) is moved by using a secondary battery as a driving power source. The electrical vehicle is a vehicle that runs by using a secondary battery as a driving power source. As described above, an automobile including a drive source other than a secondary battery (hybrid vehicle or the like) may be included. The electric power storage system is a system using a secondary battery as an electric power storage source. For example, in a home electric power storage system, electric power is stored in the secondary battery as an electric power storage source, and the electric power stored in the secondary battery is consumed as needed. Thereby, various devices such as home electric products become usable.

EXAMPLES

Specific examples of the present application will be described in detail.

Examples 1-1 to 1-49

The cylindrical type lithium ion secondary battery illustrated in FIG. 1 and FIG. 2 was fabricated by the following procedure.

In forming the cathode 21, 91 parts by mass of a cathode active material ($LiCoO_2$), 3 parts by mass of a cathode binder (polyvinylidene fluoride: PVDF), and 6 parts by mass of a cathode electrical conductor (graphite) were mixed to obtain a cathode mixture. Subsequently, the cathode mixture was dispersed in an organic solvent (N-methyl-2-pyrrolidone: NMP) to obtain a paste cathode mixture slurry. Subsequently, both surfaces of the cathode current collector 21A (strip-shaped aluminum foil being 12 nm thick) were coated with the cathode mixture slurry uniformly by a coating device, which was dried to form the cathode active material layer 21B. Finally, the cathode active material layer 21B was compression-molded by a roll pressing machine.

In forming the anode 22, 97 parts by mass of an anode active material (artificial graphite) and 3 parts by mass of an anode binder (PVDF) were mixed to obtain an anode mixture. Subsequently, the anode mixture was dispersed in NMP to obtain a paste anode mixture slurry. Subsequently, both surfaces of the anode current collector 22A (strip-shaped electrolytic copper foil being 15 nm thick) were coated with the anode mixture slurry uniformly by using a coating device, which was dried to form the anode active material layer 22B. Finally, the anode active material layer 22B was compression-molded by a roll pressing machine.

In preparing an electrolytic solution as a liquid electrolyte, an electrolyte salt ($LiPF_6$) was dissolved in solvents (ethylene carbonate (EC) and dimethyl carbonate (DMC)). In this case, the weight ratio of the solvents was EC:DMC=3:7, and the content of the electrolyte salt to the solvent was 1.2 mol/kg. In addition, as the separator 23, a microporous polypropylene film (thickness: 25 μm) was prepared.

In preparing the cathode 21, the anode 22, and the separator 23, organic silicon compounds were contained therein as needed. The organic silicon compounds were compounds having PSQ skeletons illustrated in Table 1 to Table 3. In this case, after a solution in which the organic silicon compound was dissolved was prepared, the cathode active material layer 21B, the anode active material layer 22B, and the base material layer 23A were soaked in the solution, were subsequently dried, and thereby the coating layers 21C, 22C, and 23B were formed. As a solvent in which the organic silicon compound was dissolved, n-hexane or toluene was used, and the concentration of the organic silicon compound was 1 wt %.

In assembling the secondary battery, the cathode lead 25 made of Al was welded to the cathode current collector 21A, and the anode lead 26 made of Ni was welded to the anode current collector 22A. Subsequently, the cathode 21 and the anode 22 were layered with the separator 23 in between and were spirally wound. After that, the winding end section was fixed by using an adhesive tape to form the spirally wound electrode body 20. Subsequently, the center pin 24 was inserted in the center of the spirally wound electrode body 20. Subsequently, while the spirally wound electrode body 20 was sandwiched between the pair of insulating plates 12 and 13, the spirally wound electrode body 20 was contained in the iron battery can 11 plated with Ni. In this case, the tip end of the cathode lead 25 was welded to the safety valve mechanism 15, and the tip end of the anode lead 26 was welded to the battery can 11. Subsequently, the electrolytic solution was injected into the battery can 11 by a depressurization method, and the separator 23 was impregnated with the electrolytic solution. Finally, at the open end of the battery can 11, the battery cover 14, the safety valve mechanism 15, and the PTC device 16 were swaged with the gasket 17. The cylindrical type secondary battery was thereby completed. In forming the secondary battery, Li metal was prevented from being precipitated on the anode 22 at the time of full charge by adjusting the thickness of the cathode active material layer 21B.

Cycle characteristics and continuous charge characteristics in the high temperature environment as high temperature characteristics of the secondary battery were examined. Results illustrated in Table 1 to Table 3 were obtained.

In examining the cycle characteristics, after 2 cycles of charge and discharge were performed on the secondary battery in the ambient temperature atmosphere (23 deg C.), the discharge capacity was measured. Further, 300 cycles of charge and discharge were performed on the secondary battery in the high temperature atmosphere (45 deg C.), and the discharge capacity was measured. From these results, capacity retention ratio (%)=(discharge capacity at the 300th cycle/discharge capacity at the second cycle)*100 was calculated. At the time of charge, constant current and constant voltage charge was performed at a current of 0.2 C until the voltage reached the upper limit voltage, and further charge was performed at a constant voltage (upper limit voltage) until the current reached 0.05 C. The foregoing upper limit voltage corresponded to charge voltages illustrated in Table 1 to Table 3. At the time of discharge, constant current discharge was performed at a current of 0.2 C until the final voltage of 3.0 V. "0.2 C" and "0.05 C" are respectively current values at which the theoretical capacity is completely discharged in 5 hours and 20 hours.

In examining the continuous charge characteristics, after the secondary battery was charged in the high temperature environment (60 deg C.), the secondary battery was kept in a state of continuous charge in the same environment, and time until the safety valve mechanism 15 was started (charge time: h) was measured. The charge conditions were similar to those in the case of examining the cycle characteristics. At the time of continuous charge, the final voltage was 0 mA.

TABLE 1

Anode active material: artificial graphite

| | Charge voltage (V) | PSQ skeleton | Organic silicon compound | | | | Capacity | |
| | | | m, n | R1, R2 | X | Containing place | retention ratio (%) | Charge time (h) |
| --- | --- | --- | --- | --- | --- | --- | --- | --- |
| Example 1-1 | 4.20 | $[R1SiO_{3/2}]_m$ | 8 | $CH_3$— | — | Cathode | 67 | 154 |
| Example 1-2 | | | | $(CH_3)_3C$— | | | 75 | 220 |
| Example 1-3 | | | | $C_6H_5$— | | | 72 | 248 |

TABLE 1-continued

Anode active material: artificial graphite

| | Charge voltage (V) | PSQ skeleton | m, n | R1, R2 | X | Containing place | Capacity retention ratio (%) | Charge time (h) |
|---|---|---|---|---|---|---|---|---|
| | | | Organic silicon compound | | | | | |
| Example 1-4 | | | | CH$_2$=CH— | | | 70 | 271 |
| Example 1-5 | | | 10, 12 | (CH$_3$)$_3$C— | | | 75 | 221 |
| Example 1-6 | | | 12 | C$_6$H$_5$— | | | 71 | 234 |
| Example 1-7 | 4.20 | [R2SiO$_{3/2}$]$_n$[XSiO$_{3/2}$]$_{n-1}$ | 8 | (CH$_3$)$_3$C— | Cl— | | 74 | 247 |
| Example 1-8 | | | | (CH$_3$)$_3$C— | CH$_2$=CH— | | 74 | 253 |
| Example 1-9 | | | | C$_5$H$_9$— | H— | | 76 | 249 |
| Example 1-10 | 4.20 | [R1SiO$_{3/2}$]$_m$ | 8 | CH$_3$— | — | Anode | 67 | 150 |
| Example 1-11 | | | | (CH$_3$)$_3$C— | | | 76 | 221 |
| Example 1-12 | | | | C$_6$H$_5$— | | | 72 | 246 |
| Example 1-13 | | | | CH$_2$=CH— | | | 71 | 267 |
| Example 1-14 | | | 10, 12 | (CH$_3$)$_3$C— | | | 75 | 218 |
| Example 1-15 | | | 12 | C$_6$H$_5$— | | | 70 | 232 |
| Example 1-16 | 4.20 | [R2SiO$_{3/2}$]$_n$[XSiO$_{3/2}$]$_{n-1}$ | 8 | (CH$_3$)$_3$C— | Cl— | | 75 | 244 |
| Example 1-17 | | | | (CH$_3$)$_3$C— | CH$_2$=CH— | | 74 | 232 |
| Example 1-18 | | | | C$_5$H$_9$— | H— | | 75 | 245 |

TABLE 2

Anode active material: artificial graphite

| | Charge voltage (V) | PSQ skeleton | m, n | R1, R2 | X | Containing place | Capacity retention ratio (%) | Charge time (h) |
|---|---|---|---|---|---|---|---|---|
| | | | Organic silicon compound | | | | | |
| Example 1-19 | 4.20 | [R1SiO$_{3/2}$]$_m$ | 8 | CH$_3$— | — | Separator | 65 | 155 |
| Example 1-20 | | | | (CH$_3$)$_3$C— | | | 73 | 228 |
| Example 1-21 | | | | C$_6$H$_5$— | | | 70 | 254 |
| Example 1-22 | | | | CH$_2$=CH— | | | 67 | 273 |
| Example 1-23 | | | 10, 12 | (CH$_3$)$_3$C— | | | 73 | 229 |
| Example 1-24 | | | 12 | C$_6$H$_5$— | | | 68 | 237 |
| Example 1-25 | 4.20 | [R2SiO$_{3/2}$]$_n$[XSiO$_{3/2}$]$_{n-1}$ | 8 | (CH$_3$)$_3$C— | Cl— | | 70 | 251 |
| Example 1-26 | | | | (CH$_3$)$_3$C— | CH$_2$=CH— | | 73 | 264 |
| Example 1-27 | | | | C$_5$H$_9$— | H— | | 72 | 258 |
| Example 1-28 | 4.20 | [R1SiO$_{3/2}$]$_m$ | 8 | CH$_3$— | — | Cathode and anode | 65 | 167 |
| Example 1-29 | | | | (CH$_3$)$_3$C— | | | 73 | 245 |
| Example 1-30 | | | | C$_6$H$_5$— | | | 70 | 260 |
| Example 1-31 | | | | CH$_2$=CH— | | | 68 | 288 |
| Example 1-32 | | | 10, 12 | (CH$_3$)$_3$C— | | | 74 | 247 |

TABLE 2-continued

Anode active material: artificial graphite

| | Charge voltage (V) | PSQ skeleton | m, n | R1, R2 | X | Containing place | Capacity retention ratio (%) | Charge time (h) |
|---|---|---|---|---|---|---|---|---|
| Example 1-33 | | | 12 | $C_6H_5$— | | | 70 | 251 |
| Example 1-34 | 4.20 | $[R2SiO_{3/2}]_n[XSiO_{3/2}]_{n-1}$ | 8 | $(CH_3)_3C$— | Cl— | | 72 | 262 |
| Example 1-35 | | | | $(CH_3)_3C$— | $CH_2$=CH— | | 73 | 281 |
| Example 1-36 | | | | $C_5H_9$— | H— | | 74 | 270 |

TABLE 3

Anode active material: artificial graphite

| | Charge voltage (V) | PSQ skeleton | m, n | R1, R2 | X | Containing place | Capacity retention ratio (%) | Charge time (h) |
|---|---|---|---|---|---|---|---|---|
| Example 1-37 | 4.25 | $[R1SiO_{3/2}]_m$ | 8 | $CH_3$— | — | Cathode and anode | 64 | 152 |
| Example 1-38 | | | | $(CH_3)_3C$— | | | 73 | 226 |
| Example 1-39 | | | | $C_6H_5$— | | | 68 | 234 |
| Example 1-40 | | | | $CH_2$=CH— | | | 66 | 254 |
| Example 1-41 | | | 10, 12 | $(CH_3)_3C$— | | | 72 | 225 |
| Example 1-42 | | | 12 | $C_6H_5$— | | | 67 | 228 |
| Example 1-43 | 4.25 | $[R2SiO_{3/2}]_n[XSiO_{3/2}]_{n-1}$ | 8 | $(CH_3)_3C$— | Cl— | | 70 | 241 |
| Example 1-44 | | | | $(CH_3)_3C$— | $CH_2$=CH— | | 71 | 259 |
| Example 1-45 | | | | $C_5H_9$— | H— | | 71 | 243 |
| Example 1-46 | 4.20 | — | — | — | — | — | 63 | 41 |
| Example 1-47 | | $[R1SiO_{3/2}]_m$ | 8 | $CH_3(OCH_2)_3$— | — | Cathode and anode | 60 | 42 |
| Example 1-48 | | $[R2SiO_{3/2}]_n[XSiO_{3/2}]_{n-1}$ | 8 | $CH_3$— | $CH_3(OCH_2)_3$— | | 65 | 46 |
| Example 1-49 | 4.25 | — | — | — | — | — | 57 | 33 |

In the case where the carbon material (artificial graphite) was used as an anode active material, one or both of the organic silicon compounds having the PSQ skeletons shown in Formula 1 and Formula 2 were used. In this case, the capacity retention ratio and the charge time were largely increased more than in the case that the organic silicon compounds were not used and in the case that an organic silicon compound having other PSQ skeleton was used.

More specifically, in the case where the organic silicon compound having other PSQ skeleton was used, compared to the case that the organic silicon compound was not used, the capacity retention ratio was decreased or was increased by only about 3% in some cases, and the charge time was increased by only about 12%. Meanwhile, in the case where one or both of the organic silicon compounds having the PSQ skeletons shown in Formula 1 and Formula 2 were used, compared to the case that the organic silicon compound was not used, the capacity retention ratio was increased by about 3% at minimum or more while the charge time was increased by slightly more than 250%.

In particular, in the case where the cathode 21 and the anode 22 contained the organic silicon compounds having the PSQ skeletons shown in Formula 1 and Formula 2, the capacity retention ratio was more increased. In the case where the separator 23 contained the organic silicon compound, the charge time was more increased. Further, in the case where the charge voltage was high (4.25 V), increase ratios of the capacity retention ratio and the charge time were more increased than in the case that the charge voltage was low (4.20 V).

Examples 2-1 to 2-20 and 3-1 to 3-30

Secondary batteries were fabricated by a procedure similar to that of Examples 1-1 to 1-49 except that a metal-based material (silicon or SnCoC) was used instead of the carbon material as an anode active material. After examining high temperature characteristics, results illustrated in Table 4 to Table 6 were obtained.

In the case where silicon was used, Si was deposited on both surfaces of the anode current collector 22A (electrolytic copper foil being 15 μm thick) by an electron beam evaporation method to form the anode active material layer 22B. In this case, 10 times of the deposition steps were repeated so that the thickness of the anode active material layer 22B on a single surface of the anode current collector 22A became 6 μm.

In the case where SnCoC as an SnCoC-containing material was used, Co powder and Sn powder were alloyed to obtain CoSn alloy powder. After that, C powder was added to the resultant and was dry-mixed. Subsequently, 10 g of the mixture and about 400 g of a corundum being 9 mm in diameter were set in a reaction container of a planetary ball mill (available from Ito Seisakusho Co.). Subsequently, inside of the reaction container was substituted with argon atmosphere. After that, 10 minute operation at 250 rpm and 10 minute break were repeated until the total operation time reached 20 hours. Subsequently, the reaction container was cooled down to room temperature and the reactant (SnCoC) was taken out. After that, the resultant was screened through a 280 mesh sieve to remove coarse grain.

Figure 7:
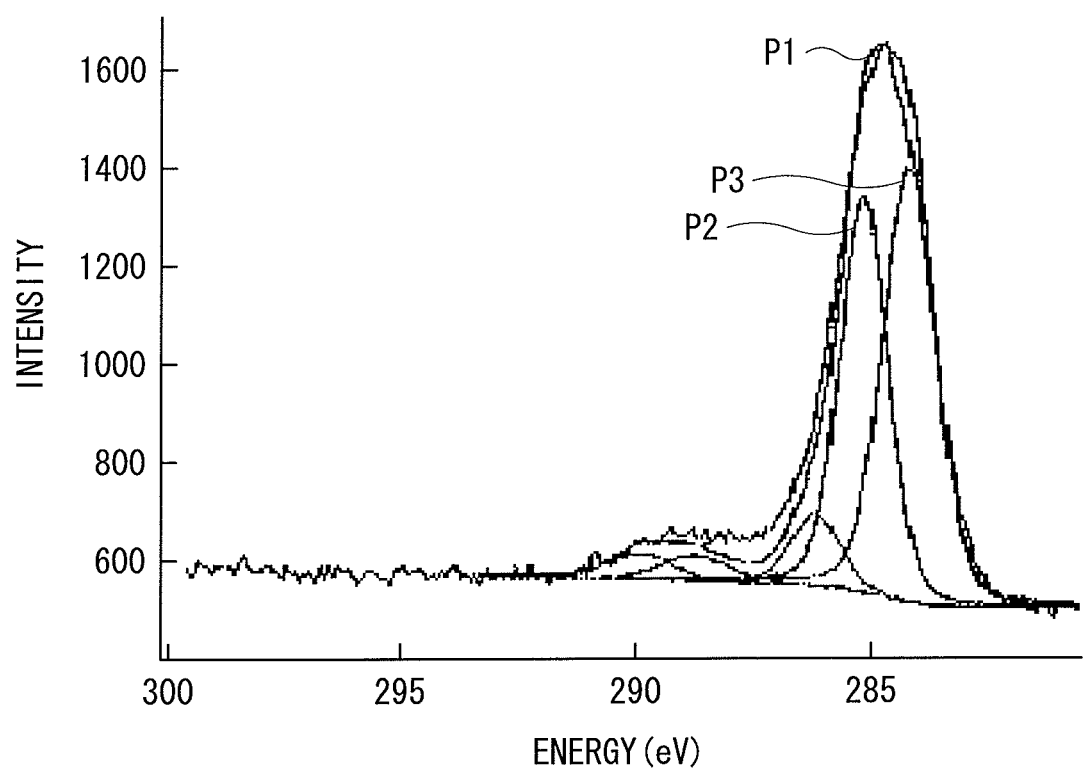
FIG. 7 is a diagram illustrating an analytical result of an SnCoC-containing material by XPS.

The composition of the obtained SnCoC was analyzed. The Sn content was 49.5 wt %, the Co content was 29.7 wt %, the C content was 19.8 wt %, and the ratio of Sn and Co (Co/(Sn+Co)) was 37.5 wt %. At this time, the Sn content and the Co content were measured by inductively coupled plasma (ICP) emission analysis, and the C content was measured by a carbon sulfur analysis apparatus. Further, the SnCoC-containing material was analyzed by an X-ray diffraction method. A diffraction peak having half bandwidth in the range of $2\theta=20$ to 50 deg was observed. Further, after SnCoC was analyzed by XPS, as illustrated in FIG. 7, peak P1 was obtained. After the peak P1 was analyzed, peak P2 of the surface contamination carbon and peak P3 of C1s in the SnCoC existing on the lower energy side (region lower than 284.5 eV) were obtained. From the foregoing result, it was confirmed that C in SnCoC was bonded with other element.

After the SnCoC was obtained, 80 parts by mass of the anode active material (SnCoC), 8 parts by mass of an anode binder (PVDF), 12 parts by mass of an anode electrical conductor (11 parts by mass of graphite and 1 part by mass of acetylene black) were mixed to obtain an anode mixture. Subsequently, the anode mixture was dispersed in NMP to obtain a paste anode mixture slurry. Finally, both surfaces of the anode current collector 22A (electrolytic copper foil being 15 μm thick) were uniformly coated with the anode mixture slurry by a coating device and the resultant was dried to form the anode active material layer 22B. After that, the anode active material layer 22B was compression-molded by a rolling press machine.

TABLE 4

| | | Anode active material: silicon | | | | | | |
|---|---|---|---|---|---|---|---|---|
| | | | Organic silicon compound | | | | Capacity | |
| | Charge voltage (V) | PSQ skeleton | m, n | R1, R2 | X | Containing place | retention ratio (%) | Charge time (h) |
| Example 2-1 | 4.20 | $[R1SiO_{3/2}]_m$ | 8 | $CH_3-$ | — | Cathode and anode | 67 | 145 |
| Example 2-2 | | | | $(CH_3)_3C-$ | | | 75 | 212 |
| Example 2-3 | | | | $C_6H_5-$ | | | 72 | 237 |
| Example 2-4 | | | | $CH_2=CH-$ | | | 70 | 254 |
| Example 2-5 | | | 10, 12 | $(CH_3)_3C-$ | | | 75 | 221 |
| Example 2-6 | | | 12 | $C_6H_5-$ | | | 71 | 230 |
| Example 2-7 | 4.20 | $[R2SiO_{3/2}]_n[XSiO_{3/2}]_{n-1}$ | 8 | $(CH_3)_3C-$ | Cl— | | 74 | 238 |
| Example 2-8 | | | | $(CH_3)_3C-$ | $CH_2=CH-$ | | 75 | 252 |
| Example 2-9 | | | | $C_5H_9-$ | H— | | 74 | 246 |
| Example 2-10 | 4.25 | $[R1SiO_{3/2}]_m$ | 8 | $CH_3-$ | — | Cathode and anode | 65 | 134 |
| Example 2-11 | | | | $(CH_3)_3C-$ | | | 74 | 208 |
| Example 2-12 | | | | $C_6H_5-$ | | | 70 | 226 |
| Example 2-13 | | | | $CH_2=CH-$ | | | 68 | 239 |
| Example 2-14 | | | 10, 12 | $(CH_3)_3C-$ | | | 73 | 211 |
| Example 2-15 | | | 12 | $C_6H_5-$ | | | 68 | 218 |
| Example 2-16 | 4.25 | $[R2SiO_{3/2}]_n[XSiO_{3/2}]_{n-1}$ | 8 | $(CH_3)_3C-$ | Cl— | | 72 | 232 |
| Example 2-17 | | | | $(CH_3)_3C-$ | $CH_2=CH-$ | | 72 | 235 |
| Example 2-18 | | | | $C_5H_9-$ | H— | | 73 | 224 |

TABLE 5

Anode active material: SnCoC

| | Charge voltage (V) | Organic silicon compound | | | | | Capacity | |
| --- | --- | --- | --- | --- | --- | --- | --- | --- |
| | | PSQ skeleton | m, n | R1, R2 | X | Containing place | retention ratio (%) | Charge time (h) |
| Example 3-1 | 4.20 | $[R1SiO_{3/2}]_m$ | 8 | $CH_3-$ | — | Cathode and anode | 64 | 165 |
| Example 3-2 | | | | $(CH_3)_3C-$ | | | 73 | 244 |
| Example 3-3 | | | | $C_6H_5-$ | | | 71 | 261 |
| Example 3-4 | | | | $CH_2=CH-$ | | | 68 | 285 |
| Example 3-5 | | | 10, 12 | $(CH_3)_3C-$ | | | 74 | 250 |
| Example 3-6 | | | 12 | $C_6H_5-$ | | | 71 | 249 |
| Example 3-7 | 4.20 | $[R2SiO_{3/2}]_n[XSiO_{3/2}]_{n-1}$ | 8 | $(CH_3)_3C-$ | $Cl-$ | | 73 | 261 |
| Example 3-8 | | | | $(CH_3)_3C-$ | $CH_2=CH-$ | | 73 | 275 |
| Example 3-9 | | | | $C_5H_9-$ | $H-$ | | 73 | 262 |
| Example 3-10 | 4.25 | $[R1SiO_{3/2}]_m$ | 8 | $CH_3-$ | — | Cathode and anode | 62 | 143 |
| Example 3-11 | | | | $(CH_3)_3C-$ | | | 70 | 220 |
| Example 3-12 | | | | $C_6H_5-$ | | | 65 | 222 |
| Example 3-13 | | | | $CH_2=CH-$ | | | 65 | 248 |
| Example 3-14 | | | 10, 12 | $(CH_3)_3C-$ | | | 70 | 213 |
| Example 3-15 | | | 12 | $C_6H_5-$ | | | 64 | 215 |
| Example 3-16 | 4.25 | $[R2SiO_{3/2}]_n[XSiO_{3/2}]_{n-1}$ | 8 | $(CH_3)_3C-$ | $Cl-$ | | 67 | 228 |
| Example 3-17 | | | | $(CH_3)_3C-$ | $CH_2=CH-$ | | 68 | 247 |
| Example 3-18 | | | | $C_5H_9-$ | $H-$ | | 69 | 232 |

TABLE 6

Anode active material: silicon and SnCoC

| | Charge voltage (V) | Organic silicon compound | | | | | Capacity | |
| --- | --- | --- | --- | --- | --- | --- | --- | --- |
| | | PSQ skeleton | m, n | R1, R2 | X | Containing place | retention ratio (%) | Charge time (h) |
| Example 2-19 | 4.20 | — | — | — | — | — | 55 | 45 |
| Example 2-20 | 4.25 | — | — | — | — | — | 51 | 38 |
| Example 3-19 | 4.20 | — | — | — | — | — | 62 | 40 |
| Example 3-20 | 4.25 | — | — | — | — | — | 52 | 32 |

In the case where the metal-based material (silicon or SnCoC) was used as an anode active material, results similar to those in the case of using the carbon material (Table 1 to Table 3) were obtained as well. That is, in the case where one or both of the organic silicon compounds having the PSQ skeletons shown in Formula 1 and Formula 2 were used, compared to the case that the organic silicon compounds were not used or the case that the organic silicon compound having other PSQ skeleton was used, the capacity retention ratio and the charge time were largely increased. In particular, in the case where the metal-based material was used, increase ratio of the capacity retention ratio was larger than that of the case using the carbon material.

From the results of Table 1 to Table 6, it was found that in the case where one or more of the cathode, the anode, and the separator contain the organic silicon compound having the PSQ shown in Formula 1 or the organic silicon compound having the PSQ shown in Formula 2 or both, the high temperature characteristics were improved.

The present application has been described with reference to the embodiment and the examples. However, the present application is not limited to the aspects described in the embodiment and the examples, and various modifications may be made. For example, the cathode active material according to the present application is similarly applicable to a lithium ion secondary battery in which the anode capacity includes the capacity by inserting and extracting lithium ions and the capacity associated with precipitation and dissolution of lithium metal, and the anode capacity is expressed by the sum of these capacities. In this case, the chargeable capacity of the anode material is set to a smaller value than that of the discharge capacity of the cathode.

Further, in the embodiment and the examples, the description has been given with the specific examples of the case in which the battery structure is the cylindrical type or the laminated film type, and with the specific example in which the battery element has the spirally wound structure. However, applicable structures are not limited thereto. The lithium ion secondary battery according to the embodiments of the present application is similarly applicable to a battery having other battery structure such as a coin type battery, a square type battery, and a button type battery or a battery in which the battery element has other structure such as a laminated structure.

It is possible to achieve at least the following configurations from the above-described exemplary embodiments of the disclosure.

(1) A lithium ion secondary battery comprising:
a cathode and an anode being opposed to each other with a separator in between; and
an electrolytic solution,
wherein one or more of the cathode, the anode, and the separator contain an organic silicon compound, the organic silicon compound including a compound having a polysilsesquioxane skeleton represented by Formula 1 or a compound having a polysilsesquioxane skeleton represented by Formula 2 or both described below,

[Formula 1]

$$[R1SiO_{3/2}]_m \quad (1)$$

where R1 is an alkyl group with carbon number of 1 to 12, an alkenyl group with carbon number of 1 to 12, an alkynyl group with carbon number of 1 to 12, a cycloalkyl group, or an aryl group, and m is one of integer numbers 4 to 12,

[Formula 2]

$$[R2SiO_{3/2}]_n[XSiO_{3/2}]_{n-1} \quad (2)$$

where R2 is an alkyl group with carbon number of 1 to 12, an alkenyl group with carbon number of 1 to 12, an alkynyl group with carbon number of 1 to 12, a cycloalkyl group, or an aryl group; X is a hydrogen group, a halogen group, an alkyl group containing an unsaturated bond, an ester group, an ester group containing an unsaturated bond, a halogenated silyl group, or an alkyl group containing a halogenated silyl group; and n is one of integer numbers 4 to 12.

(2) The lithium ion secondary battery according to (1), wherein
the cathode has a cathode active material layer on a cathode current collector,
the anode has an anode active material layer on an anode current collector, and
the cathode active material layer or the anode active material layer or both contain the organic silicon compound.

(3) The lithium ion secondary battery according to (1) or (2), wherein
the cathode has a cathode active material layer on a cathode current collector,
the anode has an anode active material layer on an anode current collector, and
the cathode active material layer or the anode active material layer or both are provided with a coating layer containing the organic silicon compound.

(4) The lithium ion secondary battery according to any one of (1) to (3), wherein
the separator has a base material layer being a porous film and a coating layer being provided on a first surface or a second surface or both of the base material layer, and
the coating layer contains the organic silicon compound.

(5) The lithium ion secondary battery according to any one of (1) to (4), wherein
An open-circuit voltage in a state of complete charge is equal to or greater than 4.25 V.

(6) An electronic device using the lithium ion secondary battery according to any one of (1) to (5).

(7) An electric power tool using the lithium ion secondary battery according to any one of (1) to (5).

(8) An electrical vehicle using the lithium ion secondary battery according to any one of (1) to (5).

(9) An electric power storage system using the lithium ion secondary battery according to any one of (1) to (5).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A lithium ion secondary battery comprising:
a cathode and an anode being opposed to each other with a separator in between; and
an electrolytic solution,
wherein one or more of the cathode, the anode, and the separator is coated with an organic silicon compound, the organic silicon compound including a compound having Formula 1 as a polysilsesquioxane skeleton or a compound having Formula 2 as a polysilsesquioxane skeleton or both described below,

[Formula 1]

$$[R1SiO_{3/2}]_m \quad (1)$$

where R1 is an alkyl group with carbon number of 1 to 12, an alkenyl group with carbon number of 1 to 12, an alkynyl group with carbon number of 1 to 12, a cycloalkyl group, or an aryl group, and m is one of integer numbers 4 to 12,

[Formula 2]

$$[R2SiO_{3/2}]_n[XSiO_{3/2}]_{n-1} \quad (2)$$

where R2 is an alkyl group with carbon number of 1 to 12, an alkenyl group with carbon number of 1 to 12, an alkynyl group with carbon number of 1 to 12, a cycloalkyl group, or an aryl group; X is a hydrogen group, a halogen group, an alkyl group containing an unsaturated bond, an ester group, an ester group containing an unsaturated bond, a halogenated silyl group, or an alkyl group containing a halogenated silyl group; and n is one of integer numbers 4 to 12.

2. The lithium ion secondary battery according to claim 1, wherein
the cathode has a cathode active material layer on a cathode current collector,
the anode has an anode active material layer on an anode current collector, and
the cathode active material layer or the anode active material layer or both contain the organic silicon compound.

3. The lithium ion secondary battery according to claim 1, wherein
the cathode has a cathode active material layer on a cathode current collector,
the anode has an anode active material layer on an anode current collector, and
the cathode active material layer or the anode active material layer or both are provided with a coating layer containing the organic silicon compound.

4. The lithium ion secondary battery according to claim 1, wherein
the separator has a base material layer being a porous film and a coating layer being provided on a first surface or a second surface or both of the base material layer, and
the coating layer contains the organic silicon compound.

5. The lithium ion secondary battery according to claim 1, wherein
An open-circuit voltage in a state of complete charge is equal to or greater than 4.25 V.

6. An electronic device using a lithium ion secondary battery, the lithium ion secondary battery comprising:
a cathode and an anode being opposed to each other with a separator in between; and
an electrolytic solution,
wherein one or more of the cathode, the anode, and the separator is coated with an organic silicon compound, the organic silicon compound including a compound having Formula 1 as a polysilsesquioxane skeleton or a compound having Formula 2 as a polysilsesquioxane skeleton or both described below,

[Formula 1]

$$[R1SiO_{3/2}]_m \qquad (1)$$

where R1 is an alkyl group with carbon number of 1 to 12, an alkenyl group with carbon number of 1 to 12, an alkynyl group with carbon number of 1 to 12, a cycloalkyl group, or an aryl group, and m is one of integer numbers 4 to 12,

[Formula 2]

$$[R2SiO_{3/2}]_n[XSiO_{3/2}]_{n-1} \qquad (2)$$

where R2 is an alkyl group with carbon number of 1 to 12, an alkenyl group with carbon number of 1 to 12, an alkynyl group with carbon number of 1 to 12, a cycloalkyl group, or an aryl group; X is a hydrogen group, a halogen group, an alkyl group containing an unsaturated bond, an ester group, an ester group containing an unsaturated bond, a halogenated silyl group, or an alkyl group containing a halogenated silyl group; and n is one of integer numbers 4 to 12.

7. An electric power tool using a lithium ion secondary battery, the lithium ion secondary battery comprising:
a cathode and an anode being opposed to each other with a separator in between; and
an electrolytic solution,
wherein one or more of the cathode, the anode, and the separator is coated with an organic silicon compound, the organic silicon compound including a compound having Formula 1 as a polysilsesquioxane skeleton or a compound having Formula 1 as a polysilsesquioxane skeleton or both described below,

[Formula 1]

$$[R1SiO_{3/2}]_m \qquad (1)$$

where R1 is an alkyl group with carbon number of 1 to 12, an alkenyl group with carbon number of 1 to 12, an alkynyl group with carbon number of 1 to 12, a cycloalkyl group, or an aryl group, and m is one of integer numbers 4 to 12,

[Formula 2]

$$[R2SiO_{3/2}]_n[XSiO_{3/2}]_{n-1} \qquad (2)$$

where R2 is an alkyl group with carbon number of 1 to 12, an alkenyl group with carbon number of 1 to 12, an alkynyl group with carbon number of 1 to 12, a cycloalkyl group, or an aryl group; X is a hydrogen group, a halogen group, an alkyl group containing an unsaturated bond, an ester group, an ester group containing an unsaturated bond, a halogenated silyl group, or an alkyl group containing a halogenated silyl group; and n is one of integer numbers 4 to 12.

8. An electrical vehicle using a lithium ion secondary battery, the lithium ion secondary battery comprising:
a cathode and an anode being opposed to each other with a separator in between; and
an electrolytic solution,
wherein one or more of the cathode, the anode, and the separator is coated with an organic silicon compound, the organic silicon compound including a compound having Formula 1 as a polysilsesquioxane skeleton or a compound having Formula 1 as a polysilsesquioxane skeleton or both described below,

[Formula 1]

$$[R1SiO_{3/2}]_m \qquad (1)$$

where R1 is an alkyl group with carbon number of 1 to 12, an alkenyl group with carbon number of 1 to 12, an alkynyl group with carbon number of 1 to 12, a cycloalkyl group, or an aryl group, and m is one of integer numbers 4 to 12,

[Formula 2]

$$[R2SiO_{3/2}]_n[XSiO_{3/2}]_{n-1} \qquad (2)$$

where R2 is an alkyl group with carbon number of 1 to 12, an alkenyl group with carbon number of 1 to 12, an alkynyl group with carbon number of 1 to 12, a cycloalkyl group, or an aryl group; X is a hydrogen group, a halogen group, an alkyl group containing an unsaturated bond, an ester group, an ester group containing an unsaturated bond, a halogenated silyl group, or an alkyl group containing a halogenated silyl group; and n is one of integer numbers 4 to 12.

9. An electric power storage system using a lithium ion secondary battery, the lithium ion secondary battery comprising:
a cathode and an anode being opposed to each other with a separator in between; and an electrolytic solution, wherein one or more of the cathode, the anode, and the separator is coated with an organic silicon compound, the organic silicon compound including a compound having Formula 1 as a polysilsesquioxane skeleton or a compound having Formula 1 as a polysilsesquioxane skeleton or both described below,

[Formula 1]

$$[R1SiO_{3/2}]_m \quad (1)$$

where R1 is an alkyl group with carbon number of 1 to 12, an alkenyl group with carbon number of 1 to 12, an alkynyl group with carbon number of 1 to 12, a cycloalkyl group, or an aryl group, and m is one of integer numbers 4 to 12,

[Formula 2]

$$[R2SiO_{3/2}]_n[XSiO_{3/2}]_{n-1} \quad (2)$$

where R2 is an alkyl group with carbon number of 1 to 12, an alkenyl group with carbon number of 1 to 12, an alkynyl group with carbon number of 1 to 12, a cycloalkyl group, or an aryl group; X is a hydrogen group, a halogen group, an alkyl group containing an unsaturated bond, an ester group, an ester group containing an unsaturated bond, a halogenated silyl group, or an alkyl group containing a halogenated silyl group; and n is one of integer numbers 4 to 12.

* * * * *